(12) United States Patent
Hu

(10) Patent No.: US 8,499,087 B2
(45) Date of Patent: Jul. 30, 2013

(54) SERVICE-BASED ROUTING FOR MOBILE CORE NETWORK

(75) Inventor: Qingmin Hu, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 687 days.

(21) Appl. No.: 12/628,181

(22) Filed: Nov. 30, 2009

(65) Prior Publication Data

US 2011/0131338 A1    Jun. 2, 2011

(51) Int. Cl.
- *G06F 15/16* (2006.01)
- *H04H 20/71* (2008.01)
- *H04W 4/00* (2009.01)
- *H04M 11/00* (2006.01)

(52) U.S. Cl.
USPC ........ 709/229; 455/3.01; 370/338; 379/93.01

(58) Field of Classification Search
USPC .......... 709/226, 229; 370/237, 338; 455/3.01; 379/93.01
See application file for complete search history.

(56) References Cited

U.S. PATENT DOCUMENTS

| | | | |
|---|---|---|---|
| 7,990,875 B2 * | 8/2011 | Massiera et al. | 370/237 |
| 2003/0204596 A1 * | 10/2003 | Yadav | 709/226 |
| 2004/0162892 A1 * | 8/2004 | Hsu | 709/221 |
| 2005/0172015 A1 * | 8/2005 | Rana et al. | 709/223 |
| 2006/0233101 A1 * | 10/2006 | Luft et al. | 370/229 |
| 2008/0095339 A1 * | 4/2008 | Elliott et al. | 379/93.01 |
| 2008/0177896 A1 * | 7/2008 | Quinn et al. | 709/238 |
| 2008/0253322 A1 * | 10/2008 | So et al. | 370/329 |
| 2009/0201808 A1 * | 8/2009 | Bettink et al. | 370/230 |

* cited by examiner

*Primary Examiner* — Firmin Backer
*Assistant Examiner* — Michael A Chambers
(74) *Attorney, Agent, or Firm* — Turocy & Watson, LLP

(57) ABSTRACT

System(s), method(s), and device(s) that enable establishment of data session based in part on services are presented. When establishing a data session for a communication device, the desired mobility gateway can be dynamically assigned via a specified policy mechanism or provisioned using a predefined service policy table, where particular services are linked with respective identifiers associated with respective mobility gateways. A communication device can reference the service policy table to locate a service that is to be used for the data session and can identify an identifier(s) linked to the service(s) and associated with a mobility gateway(s). The identifier(s) can be received and used to facilitate selecting one or more respective mobility gateways for the data session(s). The service policy table can be automatically pushed to the communication device or the communication device can initiate a download of the service policy table when the default data connection is established.

20 Claims, 11 Drawing Sheets

SERVICE-BASED ROUTING FOR MOBILE CORE NETWORK

TECHNICAL FIELD

The subject innovation generally relates to wireless communications, and, more particularly, to service-based routing for a core network (e.g., Long Term Evolution (LTE) core network).

BACKGROUND

Typically, a communication environment, such as a wireless communication environment, can comprise a Radio access network (RAN) and a core network (e.g., in an LTE architecture) that can be employed to facilitate communication between communication devices (e.g., cellular phones, laptop computers, etc.). A core network can comprise various components, such as a Serving Gateway (SGW) and a Packet Data Network Gateway (PDN-GW), to facilitate providing connectivity for communication devices and routing of data to/from communication devices. Conventionally, policy decisions are enforced at the end of the data connection, at the PDN-GW, so all policy-based functions have to be performed at the PDN-GW. For example, conventionally, one cannot set up a data session based on a particular service parameter to one PDN-GW, while setting up another data session to another PDN-GW based on another service parameter. Also, conventionally, one must wait until the connection is established before any policy actions can be taken.

It is desirable to provide improved flexibility of the core network to facilitate providing new and/or improved services. Further, it is desirable to be able to enforce policy decisions prior to establishment of the data session.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides systems, methods, and devices that can establish data sessions associated with communication devices based at least in part on the type of service being utilized are presented. In an aspect, the subject innovation can include a desired number of mobility gateways (e.g., data and/or voice gateways, such as Packet Data Network Gateways (PDN-GWs)), where one or more of the desired number of mobility gateways can each comprise a session establishment component that can establish a data session(s) for a communication device (e.g., cellular phone, wireless laptop computer, etc.) and efficiently select a desired mobility gateway(s) to be employed for the data session(s), based at least in part on the type of service(s) being initiated or requested. In accordance with various embodiments, the selection of the desired mobility gateway can be performed dynamically or by using a service policy table.

In an embodiment, the session establishment component can be associated with and can access a service policy component, which can contain a service policy table that can comprise information that will link or map respective services to respective mobility gateways associated with a core network. For example, one or more of the mobility gateways can be identified to be used for a first service, such as Voice over Internet Protocol (VOIP), (and/or one or more other services) and one or more other mobility gateways can be identified to be used for another service, such as a multimedia service, (and/or one or more other services) and still one or more other mobility gateways can be identified to be respectively used for one or more other respective services. A mobility gateway (s) and/or another component (e.g., service policy component) in the core network can update the policy service table, as desired, with updated information relating respective mobility gateways and/or communication devices in the core network. For example, when the amount or type of available resources of a particular mobility gateway changes, the particular mobility gateway (e.g., the session establishment component of that mobility gateway) can communicate information to the service policy component regarding the change in available resources for that mobility gateway and the service policy service table can be updated with that information. When, for a particular service, there is more than one mobility gateway that is linked to that particular service, the mobility gateway to be selected to be connected to a communication device can be determined based at least in part on predefined service criteria. In an aspect, the respective mobility gateways can be respectively identified in the service policy table by respective identifiers, such as, for example, respective access point names (APNs).

In an aspect, when a communication device is turned on in the communication network and/or enters the communication network, a default data connection (e.g., default bearer) can be established between the communication device and a mobility gateway in the core network. In accordance with an embodiment, when the default data connection is established, the communication device can initiate or request a download of the service policy table from the service policy component (e.g., communication device can "pull" the service policy table from the core network), and the service policy table can be communicated to the communication device via the default data connection. In accordance with another embodiment, when the default data connection is established between the communication device and a particular mobility gateway, the particular mobility gateway can access the service policy table and can communicate the service policy table to the communication device via the default data connection (e.g., the gateway can "push" the service policy table to the communication device). When the communication device initiates a particular application or service, the communication device can reference (e.g., look up) the particular application or service in the service policy table and can identify a desired mobility gateway (e.g., identify an identifier, such as an APN, that is associated with the mobility gateway) that is linked with or mapped to the particular application or service in the service policy table. The communication device can communicate the identifier associated with the desired mobility gateway to the core network, and the core network (e.g., default mobility gateway in the core network) can establish an additional data connection(s) (e.g., a dedicated data connection(s) or bearer(s)) between the communication device and the desired mobility gateway related to the identifier. In an aspect, the service policy table can be automatically and/or periodically updated with new information relating to the mobility gateways associated with the core network (e.g., update respective mobility gateways that are associated with a respective service(s) as well as the associated mapping of a respective service(s) to a respective mobility gateway).

In another embodiment, as an alternative to, or in addition to, using the service policy table, when a default data connection is established between a communication device and a particular mobility gateway in the core network and an application or a service is initiated with respect to the communication device (e.g., initiated by the communication device, initiated by another communication device desiring to communicate with the communication device), the session establishment component of the default mobility gateway can dynamically identify and select a desired mobility gateway based at least in part on the application or service initiated with respect to the communication device and/or the predefined service criteria. The particular mobility gateway (e.g., default mobility gateway) can receive information relating to the application service that can facilitate identifying the application or service, and the particular mobility gateway can evaluate that received information and apply predefined service rules, based at least in part on the predefined service criteria, to dynamically identify and select the desired mobility gateway with which an additional data connection(s) (e.g., a dedicated data connection(s) or bearer(s)) is to be established for the communication device.

In still another aspect, the desired mobility gateway also can access, implement, and enforce other policy (e.g., standard policy) with regard to communications by the communication device via that mobility gateway in the communication network. The subject innovation, by, for example, taking into account the service or application to be utilized in the data session being established with respect to the communication device when determining which mobility gateway to employ for the data session, can thereby facilitate enforcing at least certain policy decisions, such as, for example, certain service policy decisions, prior to or concurrently with establishment of the data session with the communication device.

In accordance with various other embodiments, as an alternative to, or in addition to, the communication device containing a policy component and associated service policy table and identifying a desired mobility gateway based at least in part on the application or service being used, other components (e.g., edge gateway, such as, for example, a provider edge (PE) router; and/or a policy server) associated with the core network can include a service policy component and associated service policy table that can be utilized by such component(s) to identify and facilitate selecting a desired mobility gateway (e.g., PDN-GW) for a data session when a particular application or service is initiated with respect to a communication device, based at least in part on the particular application or service and/or the predefined service criteria. Such component in the core network can receive information relating to the application or service initiated by the communication device from the communication device very early (e.g., when a data connection, such as an initial or default data connection, is established, and prior to an additional data connection(s) being established) and such component can facilitate applying and/or enforcing certain policy, such as certain service related policies at or near the provider edge and during that early stage of establishing a data session for the communication device with a desired mobility gateway.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
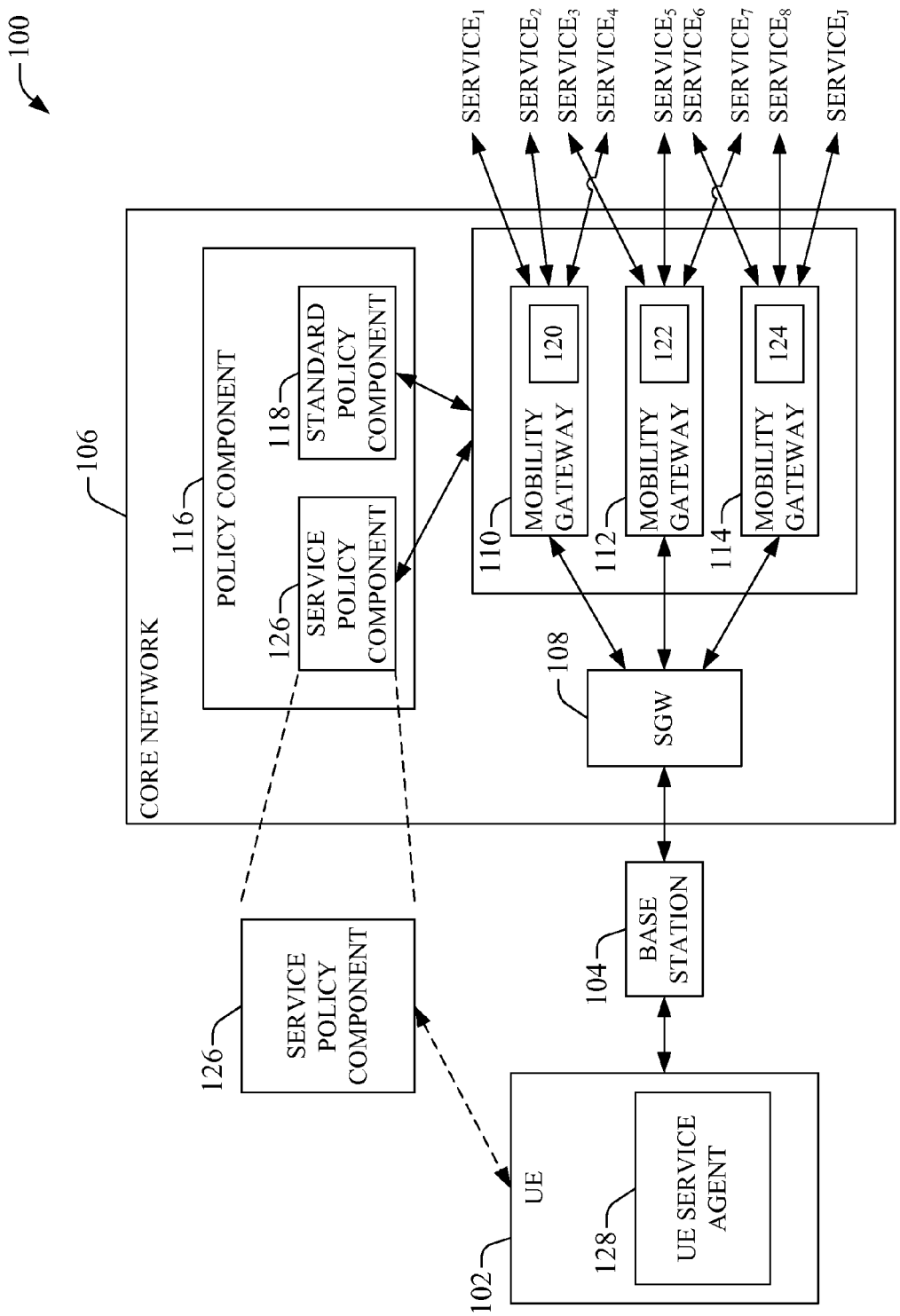
FIG. 1 is a block diagram of an example system that can utilize service-related information to facilitate establishment of a data session(s) for a communication device in a communication network in accordance with an embodiment of the disclosed subject matter.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, printer, etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations are relevant to the subject specification.

3G Third Generation
3GPP Third Generation Partnership Project
AGPS Assisted GPS
AP Access Point
ADSL Asymmetric Digital Subscriber Line
AWS Advanced Wireless Services
BRAS Broadband Remote Access Server
BTA Basic Trading Area
CN Core Network
CS Circuit-Switched
CSCF Call Session Control Function
CPE Customer Premise Equipment
CPN Customer Premise Network
DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
XDSL Asynchronous-DSL or Synchronous-DSL Referring to the drawings, FIG. 1 is a block diagram of an example system 100 that can utilize service-related information to facilitate establishment of a data session(s) for a communication device (e.g., user equipment (UE)) in a communication network in accordance with an embodiment of the disclosed subject matter. In an aspect, example system 100 can include a desired number of UEs (e.g., mobile and/or wireless communication device, such as a mobile phone (e.g., 3GPP UMTS phone), personal digital assistant (PDA), computer, IP television (IPTV), gaming console, set-top box, printer, etc.), including UE 102 in a communication environment (it is to be appreciated and understood that only one UE is shown in the interest of brevity and clarity). The UE 102 can be located in a wireless portion (e.g., region) of the communication network, for example. Each UE 102 can be connected (e.g., wirelessly connected) to respective base stations, such as base station 104, that serve respective coverage areas to facilitate communication in the wireless communication environment. Each base station 104 can serve a respective coverage macro cell that can cover a specified area, and each base station 104 can service mobile wireless devices, such as UE 102, located in the respective area covered by the macro cell, where such coverage can be achieved via a wireless link (e.g., uplink (UL), downlink (DL)). When an attachment attempt is successful, the UE 102 can be served by the base station 104 and incoming voice and data traffic can be paged and routed to the UE 102 through the base station 104, and outgoing voice and data traffic from the UE 102 can be paged and routed through the base station 104 to other communication devices (e.g., another UE). In an aspect, the UE 102 can be connected and can communicate wirelessly using virtually any desired wireless technology, including, for example, cellular, Wi-Fi, Wi-Max, wireless local area networks (WLAN), etc. It is to be appreciated and understood that, while FIG. 1 depicts one UE being served by one base station, the subject innovation is not so limited, as, in accordance with the subject innovation, there can be more than one UE, more than one base station, and/or a base station can serve one or more UEs at a given time.

In an aspect, the base station 104 can be associated with a core network 106, such as a mobile core network, that can facilitate wireless communication of voice and data associated with communication devices, such as UE 102, in the communication network. The core network 106 can facilitate routing voice and data communications between a communication device(s), such as UE 102, and other communication devices (e.g., phone, computer, email server, multimedia server, audio server, video server, news server, financial or stock information server, other communication devices associated with the Internet, etc.) in the communication network. The core network 106 also can allocate resources to the UEs 102 in the network, convert or enforce protocols, establish and enforce Quality of Service (QoS) for the UEs 102, provide applications or services in the network, translate signals, and/or perform other desired functions to facilitate system interoperability and communication in the wireless communication network. The core network 106 further can include desired components, such as routers, nodes (e.g., SGSN, GGSN, etc.), switches, interfaces, controllers, etc., that can facilitate communication of data between communication devices in the communication network.

In an aspect, the core network 106 can include a serving gateway (SGW) 108 that can be directly or indirectly (e.g., via a radio network controller (not shown)) connected to the base station 104. The SGW 108 can route data packets to/from the UE 102 from/to other communication devices and also can act as a mobility anchor during inter-base station handovers and as a mobility anchor between LTE and other 3GPP technologies. For example, with regard to routing and paging of a UE 102, the SGW 108 can trigger paging when DL data is being sent to the UE 102 and can route data to the UE 102, and when the UE 102 is in an idle state, the SGW 108 can terminate the DL data path. In accordance with other aspects, the SGW 108 can facilitate managing and storing UE contexts (e.g., parameters of the IP bearer service, network internal routing information, etc.).

The core network 106 also can comprise a desired number of other gateways, such as mobility gateway 110, mobility gateway 112, and mobility gateway 114 (e.g., Packet Data Network Gateways (PDN-GWs)), which also can be referred to as data/voice gateways (e.g., data and/or voice gateways that can facilitate data or voice communications in the communication network), and which can be associated with (e.g., directly or indirectly connected to) the SGW 108, and can provide connectivity between the UE 102 and external PDNs, for example, by being the point of exit and entry of traffic associated with the UE 102. In an aspect, the UE 102 can have simultaneous connectivity with one or more of the mobility gateways 110, 112 and/or 114, as desired, in order to access one or more PDNs and/or one or more associated services or applications (Note: FIG. 1 generically depicts services and applications as $SERVICE_1$ through $SERVICE_J$, with J being a positive integer), but is intended to cover services and/or applications), for example, services or applications associated with the Internet (and associated communication devices) and/or servers (e.g., multimedia server, video server, audio server, messaging server, etc.). In another aspect, each of the mobility gateways 110, 112, and 114 can perform policy enforcement, packet filtering for each UE 102, charging support, lawful data interception, and packet inspection. In still another aspect, the mobility gateways 110, 112, and 114 can act as a mobility anchor between 3GPP and non-3GPP technologies (e.g., WiMax) and 3GPP2 (e.g., CDMA, EvDO).

In accordance with an aspect, the mobility gateways 110, 112, 114 can be associated with a policy component 116 (e.g., a policy server or a Policy and Charging Rules Function (PCRF)) that can comprise policies that can be accessed and enforced by the respective mobility gateways 110, 112 and 114. The policy component 116 can include a standard policy component 118 that can contain standard or conventional policies that can facilitate providing connectivity between the UE 102 and external PDNs, and associated applications or services, data packet inspection, routing of data traffic, etc.

Conventionally, policy decisions are enforced at the end of the data connection, at a PDN-GW, resulting in all policy-based functions having to be performed at the PDN-GW. For example, conventionally, one cannot set up a data session based on a particular service parameter to one PDN-GW, while setting up another data session to another PDN-GW based on another service parameter. Also, conventionally, one must wait until the connection is established before any policy actions can be taken. As a result, there can less efficiency in a conventional communication system, as, for example, a communication device may be connected to a PDN-GW for a particular service, when there is another gateway that would better serve the communication device and/or more efficiently utilize network resources, or, as another example, a communication device, which desires to use a VoIP service, may have the VoIP call processed by a national data center which may be many miles away (e.g., thousands of miles away) from the communication device, because the conventional default PDN-GW (e.g., gateway with which a default bearer is established when establishing a data session with a communication device) does not know the type of service desired by the communication device or the PDN-GW with which the communication device desires to be connected via a dedicated bearer.

In contrast to conventional systems and techniques, the subject innovation can add service-related information to the data session establishment process so that the data session can be policy enabled and established based at least in part on the service policy, associated with the service or application being utilized by the communication device (e.g., UE 102). As a result, the subject innovation can enable network operators to establish data sessions based at least in part on the service or application (e.g., type of service or application) desired to be utilized by the communication device.

In an aspect, one or more of the mobility gateways 110, 112, and/or 114 (e.g., PDN-GWs), can comprise a session establishment component, such as session establishment components 120, 122, and/or 124, where the session establishment component can establish a data session(s) for a UE 102 (e.g., cellular phone, wireless laptop computer, gaming device, etc.) and efficiently select a desired routing(s) and connection(s) (e.g., select and connect to a desired mobility gateway) for the data session(s), based at least in part on the service-related information relating to the service(s) or application(s) being initiated or requested with respect to the UE 102. Thus, service-related information can be used to facilitate selecting a desired mobility gateway (e.g., PDN-GW) as a dedicated mobility gateway early on in the data session establishment process based at least in part on the desired service (e.g., prior to connecting the UE 102 to a dedicated mobility gateway) and connecting the UE 102 to a desired mobility gateway. In accordance with various embodiments, the selection of the desired mobility gateway can be performed dynamically or by using a service policy table 126, which can be part of the policy component 116 in the core network 106.

In an embodiment, the session establishment component (e.g., 120, 122, and/or 124) can be associated with and can access the service policy component 126, which can contain a service policy table that can comprise information that will link or map respective services or applications (e.g., VoIP or other type of voice communication, Internet-related service or application, multimedia service or application, video service or application, audio service or application, email service or application, messaging service or application (e.g., instant messaging, text messaging, picture messaging, etc.), electronic gaming service or application, IPTV service or application, location service or application, mapping service or application, social networking service or application, weather service or application, etc.) to respective mobility gateways 110, 112, and/or 114 associated with the core network 106. For example, one or more of the mobility gateways (e.g., mobility gateway 110) can be identified to be used for a first service, such as VoIP (as well as one or more other services, if desired), and one or more other mobility gateways (e.g., mobility gateway 112) can be identified to be used for another service, such as a multimedia service (as well as one or more other services, if desired) and still one or more other mobility gateways (e.g., mobility gateway 114) can be identified to be respectively used for one or more other respective services. In an aspect, the respective mobility gateways can be respectively identified in the service policy table by respective identifiers, such as, for example, respective access point names (APNs) that can be unique to each mobility gateway. The respective identifiers of the respective mobility gateways can be mapped or linked to the respective service(s) or application(s) for which the respective mobility gateways can facilitate provision. It is to be appreciated and understood that a mobility gateway can be suitable for and the mobility gateway's identifier mapped to one or more services or applications in the service policy table.

In an aspect, the service policy component 126 (and/or another component, such as a mobility gateway) in the core network 106 can create the service policy table and/or update the service policy table in the service policy component 126, as desired, with updated information and updated (e.g., modified) mapping regarding respective mobility gateways 110, 112, 114 associated with the core network 106. For example, if and when the amount or type of available resources of a particular mobility gateway changes, the particular mobility gateway (e.g., the session establishment component 120, 122, or 124 of that mobility gateway) can communicate information to the service policy component 126 regarding the change in available resources for that mobility gateway and the service policy table can be updated with that information by the service policy component 126 and/or the mapping associated with that mobility gateway can be modified, as desired or needed. When, for a particular service, there is more than one mobility gateway of the mobility gateways 110, 112 and 114 whose identifier is to be linked to that particular service, the mobility gateway, which is to be selected to be connected to a UE 102, can be determined based at least in part on predefined service criteria.

In an aspect, when a UE 102 is turned on in the communication network and/or enters the communication network, a default or initial data connection (e.g., default bearer) can be established between the UE 102 and an available mobility gateway (e.g., mobility gateway 110) in the core network 106, where such available mobility gateway also can be referred to as a default mobility gateway. The default mobility gateway can determine whether a particular UE (e.g. 102) has the functionality to reference the service policy table and identify a desired mobility gateway to be used for an initiated service or application. For instance, an indicator or a flag can be employed to indicate whether the particular UE includes such functionality. If the default mobility gateway determines that the particular UE (e.g., 102) does comprise such functionality, the default mobility gateway can interact with the UE, such as disclosed herein, to facilitate establishing a data session based at least in part on service-related information associated with the UE; and, if the default mobility gateway determines that the particular UE does not comprise such functionality the default mobility gateway can facilitate dynamically determining a desired mobility gateway based at least in part on service-related information associated with the particular UE and predefined service criteria or can facilitate establishing the data session without taking into account service-related information associated with the particular UE, in accordance with various embodiments. In accordance with various other embodiments, such as disclosed herein, other components (e.g., Provider Edge (PE), SGW, etc.) can comprise functionality to reference the service policy table to facilitate establishing a data session with a UE based at least in part on service-related information relating to the UE.

In accordance with an embodiment, the UE 102 can comprise a UE service agent 128, and when the default data connection is established, the UE service agent 128 can initiate or request a download (or update) of the service policy table, or desired portion thereof, from the service policy component 126 (e.g., communication device can "pull" the desired portion of the service policy table from the core network 106), and the service policy table, or desired portion thereof, can be communicated to the UE 102 via the default data connection. In accordance with another embodiment, when the default data connection is established between the UE 102 and a particular mobility gateway (e.g., mobility gateway 110), the particular mobility gateway can access the service policy table, or desired portion thereof, in the service policy component 126 and can communicate the desired information in the service policy table to the UE 102 via the default data connection in accordance with a predefined service rule, which can specify that the mobility gateway is to automatically provide the desired portion of the service policy table to the UE 102 (e.g., the default mobility gateway can "push" the desired portion of the service policy table to the UE 102).

In an aspect, when the UE 102 initiates a particular application or service (or when an application or service is initiated by another communication device to provide information to the UE 102), the UE service agent 128 can reference (e.g., look up) the particular application or service in the service policy table in the UE service agent 128 and can identify a desired mobility gateway (e.g., mobility gateway 110, mobility gateway 112, or mobility gateway 114) that is linked with or mapped to (e.g., corresponds with) the particular initiated application or service in the service policy table. The UE service agent 128 can identify the desired mobility gateway based at least in part on the service or application being initiated and the predefined service criteria (e.g., the service policy table can be generated with a mapping to respective mobility gateway identifiers based at least in part on the respective services or applications and the predefined service criteria). The UE 102 can communicate the identifier(s) (e.g., more than one identifier when there is more than one service being initiated by the UE 102) associated with the desired mobility gateway to the default mobility gateway (e.g., default PDN-GW) in the core network 106 via the default data connection, and the default mobility gateway can establish a dedicated data connection(s) (e.g., an additional data connection(s) associated with the UE 102) between the UE 102 and the desired mobility gateway(s) associated with the identifier(s). In an aspect, the service policy table in the service policy component 126 and/or service policy table in the UE service agent 128 can be automatically and/or periodically updated with new information relating to the mobility gateways (e.g., change in available resources of a mobility gateway, change in location of UE 102 in relation to the respective mobility gateways, etc.) associated with the core network 106 (e.g., update respective mobility gateways that are associated with a respective service(s) as well as the associated mapping of a respective service(s) to a respective mobility gateway).

In accordance with another embodiment, as an alternative to, or in addition to, using the service policy table, when a default or initial data connection is established between a UE 102 and a particular mobility gateway (e.g., default PDN-GW) in the core network 106 and the UE 102 initiates an application or a service (or when an application or service is initiated by another communication device to provide information to the UE 102), the session establishment component (e.g., 120, 122, or 124) of that mobility gateway can automatically or dynamically identify and select a desired mobility gateway with which to connect (e.g., establish a dedicated data connection(s) with) the UE 102 based at least in part on the application or service initiated by the UE 102 and/or the predefined service criteria. The particular mobility gateway (e.g., default PDN-GW) can receive or obtain (e.g., via packet inspection, such as deep packet inspection(DPI)) information relating to the application(s) or service(s) and can evaluate such information and apply predefined service rules (e.g., in accordance with the predefined service criteria) to such information to automatically or dynamically identify the application(s) or service(s) initiated by or associated with the UE 102 and to automatically or dynamically identify and select (or assign) the desired mobility gateway(s) (e.g., PDN-GW(s)) with which a dedicated data connection(s) is to be established for the UE 102. As desired, if during a dynamic identification and/or assignment of a desired mobility gateway for a data session, the default mobility gateway detects any change associated with the UE 102 or a mobility gateway(s), the default mobility gateway can facilitate updating the service policy table (and mapping therein) with regard to the detected change.

For example, when both a service policy table and dynamic assigning of mobility gateways is employed, a UE 102 may identify a particular gateway to provide a service based at least in part on the information contained in the service policy table provided to the UE 102 (e.g., the UE 102 may locate the identifier of a mobility gateway that is associated with the service in the service policy table). The UE 102 can provide that identifier to the default mobility gateway; however, the default mobility gateway can dynamically determine that the mobility gateway selected by the UE 102 is not currently the most ideal mobility gateway to use to establish the data session for the desired service based at least in part on the predefined service criteria. For instance, the available resources of the selected mobility gateway or another mobility gateway may have changed in between the time the UE 102 obtained the service policy table and the time the service was initiated with respect to the UE 102, and as a result, the other mobility gateway is currently better suited to be connected with the UE 102 to facilitate providing the desired service. In such instance, the default mobility gateway can dynamically select the other mobility gateway and can facilitate establishing a dedicated data connection(s) between the UE 102 and the other mobility gateway so that the UE 102 can access the desired service.

In an aspect, the predefined service criteria can relate to, for example, the relative location (e.g., in terms of backhaul and/or geographically) of a UE 102 with respect to the mobility gateways that can handle a particular service, respective amount of latency expected to be incurred in relation to respective mobility gateways, relative cost of using one particular mobility gateway over another mobility gateway for a data session, whether a secure connection is needed or not for a data session, available functions or features associated with the UE 102, preferences associated with the UE 102, desired Quality of Service (QoS), respective resources currently available at the respective mobility gateways (e.g., respective current loads, such as data loads or with respect to other resources, on the respective mobility gateways), current congestion in the network, type of subscription (e.g., with the network operator) associated with the UE 102, whether a particular UE contains the functionality to utilize the service policy table or identify a desired mobility gateway in the service policy table, etc. Information relating to one or more of the predefined service criteria can be evaluated (e.g., applying a desired matrix and/or associated service rules) in order to determine which mobility gateway(s) is desired to be employed with respect to a particular service or application to facilitate mapping identifiers respectively associated with mobility gateways with respective services and/or applications, where the mapping can be stored in the service policy table and/or utilized to facilitate dynamically assigning a desired mobility gateway to a particular data session. In another aspect, the matrix can be dynamically variable, as desired, in order to adjust in accordance with service rules to be applied in identifying or assigning (e.g., dynamically) a desired mobility gateway and/or updating the service policy table.

In another aspect, the service policy table provided to a particular UE 102 can be tailored to a particular UE 102. For example, the service policy table and mapping of gateway identifiers to respective services or applications can be generated and tailored based at least in part on the current location of the UE 102 (e.g., in terms of backhaul and/or geographically) in relation to the respective locations of the respective mobility gateways, the type of subscription associated with the UE 102, the available functions or features associated with the UE 102, and/or other factors associated with the UE 102. This can facilitate reducing the amount of service policy information that is to be communicated to the UE 102 so that service policy information pertinent to that particular UE 102 is provided to that UE 102.

As one non-limiting example of utilizing service-related information during establishment of a data session(s), the subject innovation can enable more than one data session to be established concurrently for a UE 102 based at least in part on respective services or applications desired to be utilized by the UE 102. For instance, the UE 102 can desire to utilize a first service or application (e.g., relating to an audio download service) to access the Internet, and a second service or application to make a VoIP call. When the first data session is going through the establishment process, where a default data connection is set up with a default mobility gateway, the UE 102 can reference the service policy table in the service agent 128 and can look for an identifier associated with a mobility gateway that is linked to and can provide the desired first service or application to the UE 102, and the UE 102 can identify and select a first identifier associated with the first service or application and can provide the first identifier to the default mobility gateway (or the default mobility gateway can dynamically identify the first service or application), and the default mobility gateway can use the received first identifier to select a first mobility gateway (e.g., PDN-GW) associated with the first identifier and can facilitate establishing a dedicated data connection (e.g., an additional data connection) between the UE 102 and the first mobility gateway based at least in part on the first service and/or an associated parameter (s) of the first service (or the default mobility gateway can dynamically identify and select the first mobility gateway based at least in part on the first service (and/or an associated parameter(s) of the first service) and the predefined service criteria and associated rules). When the second data session is going through the establishment process (e.g., simultaneously or concurrently, or substantially simultaneously or concurrently, with establishment of the first data session; or subsequent to the establishment of the first data session—as desired), the UE 102 can reference the service policy table in the service agent 128 and can look for an identifier associated with a mobility gateway that is linked to and can provide the desired second service or application to the UE 102 (e.g., a mobility gateway that can process a VoIP call and is relatively close location-wise to the UE 102 with respect to the backhaul associated with that mobility gateway and/or routing of data traffic, as compared to other mobility gateways, and/or meets other desired service criteria, which can facilitate reducing latency), and can identify and select a second identifier associated with the second service or application and can provide the second identifier to the default mobility gateway (or the default mobility gateway can dynamically identify the second service or application), and the default mobility gateway can use the received second identifier to select a second mobility gateway (e.g., second PDN-GW) associated with the second identifier and can facilitate establishing a dedicated data connection between the UE 102 and the second mobility gateway based at least in part on the second service and/or an associated parameter(s) of the second service (or the default mobility gateway can dynamically identify and select the second mobility gateway based at least in part on the second service (and/or an associated parameter(s) of the second service) and the predefined service criteria and associated rules).

The subject innovation, by employing a session establishment component and taking into account the service or application being utilized by a UE 102 during establishment of the data session, can thereby facilitate enforcing at least certain policy decisions, such as, for example, certain service policy decisions, prior to or concurrently with establishment of a data session associated with the UE 102. The subject innovation can enable more efficient establishment of data sessions and routing of data traffic and overall can more efficiently utilize network resources, as compared to conventional communication systems and techniques. Another advantage of the subject innovation, in contrast to conventional communication systems and techniques, is that when a UE 102 is roaming in a visited network, the visited network does not have to use the same identifier (e.g., APN) to provide a desired service (e.g., VoIP service) as the home network associated with the UE 102, but rather the service policy table (or portion thereof) associated with the service policy component 126 for the visited network can be provided to the UE 102 while it is associated with the visited network (e.g., visited core network) and/or a desired mobility gateway can be automatically or dynamically assigned to a data session by the visited network to facilitate establishing a data session in the visited network.

It is to be appreciated and understood that the subject innovation is depicted in FIG. 1 as having one UE 102; one base station 104; one core network 106; one SGW 108; three mobility gateways 110, 112, 114; one policy component 116; one standard policy component 118; three session establishment components 120, 122, and 124; one service policy component 126; one UE service agent 128; and three services available per mobility gateway (e.g., assigned to a mobility gateway); however, the subject innovation is not so limited, as there also can be more than one UE; more than one base station; more than one core network; more than one SGW; more than one policy component; less than or more than three mobility gateways; more than one policy component; more than one standard policy component; less than or more than three session establishment components; more than one service policy component; more than one UE service agent; and/or less than or more than three services associated with each mobility gateway—as desired. It is to be further appreciated and understood that, while the policy component 116 is depicted as being in the core network 106, the subject innovation is not so limited, as, in accordance with various other embodiments, the policy component 116 can be a stand-alone unit, or can be part of another component in system 100, or portions (e.g., components) of the policy component 116 can be distributed as separate components throughout the system 100, as desired.

In accordance with one embodiment of the subject innovation, one or more components (e.g., session establishment components 120, 122, and/or 124; policy component 116, service policy component 126, etc.) in the communication network can utilize artificial intelligence (AI) techniques or methods to infer (e.g., reason and draw a conclusion based at least in part on a set of metrics, arguments, or known outcomes in controlled scenarios) whether a mobility gateway associated with the identifier provided to the default mobility gateway by the UE 102 is the mobility gateway to be assigned to the UE 102 for the data session (or whether the identifier is to be ignored in favor of dynamically assigning a mobility gateway to the UE 102); a mobility gateway (e.g., PDN-GW) to be assigned to a UE 102 for a particular service or application; whether a service policy table is to be updated; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with system 100 (or another system(s) or method(s) disclosed herein) to facilitate rendering an inference(s) related to the system 100 (or another system(s) or method(s) disclosed herein).

In particular, the one or more components in the network can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of the historic and/or current data associated with system 100 (or another system(s) disclosed herein) to facilitate making inferences or determinations related to system 100 (or another system(s) disclosed herein).

Figure 2:
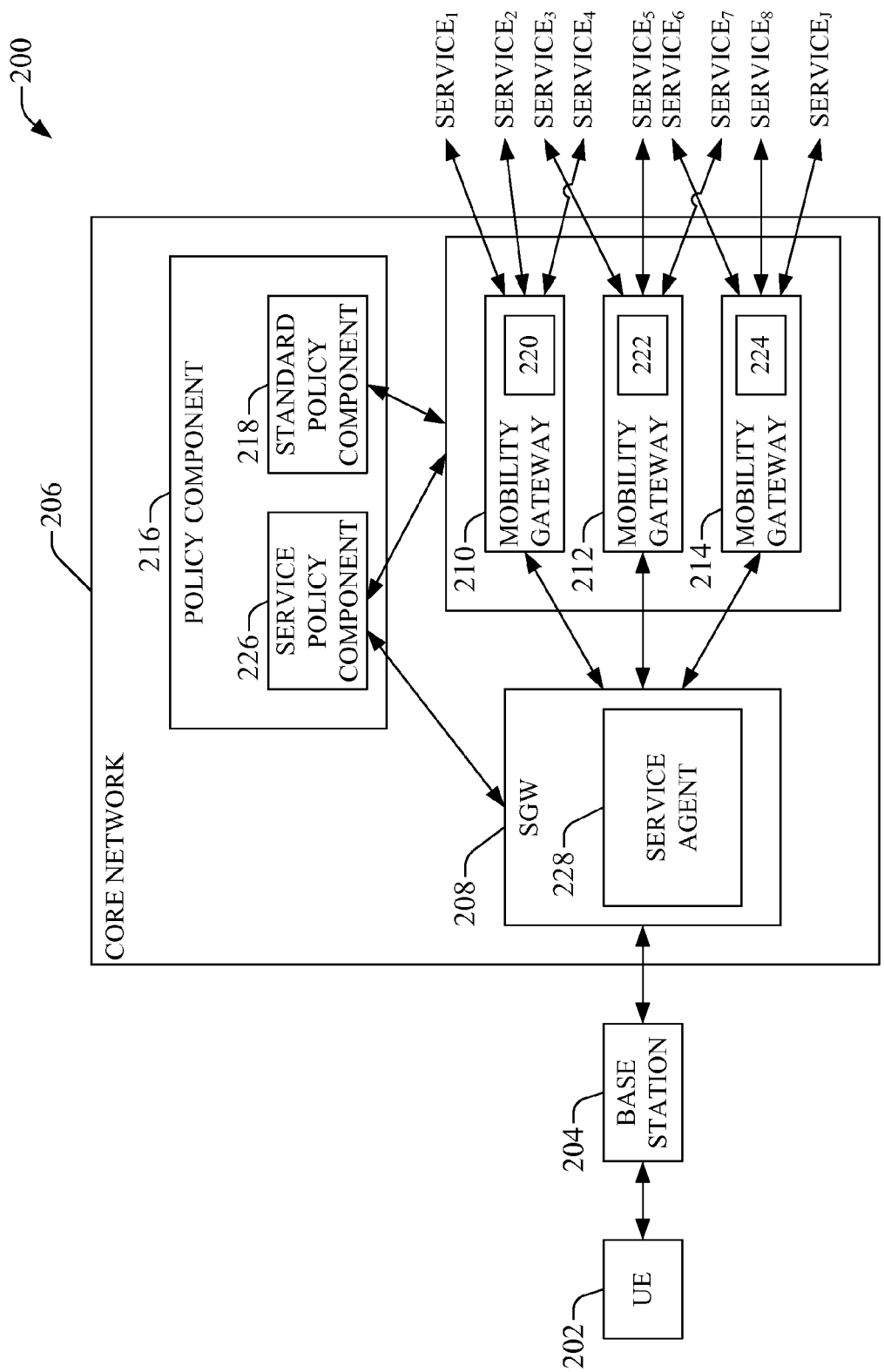
FIG. 2 is a block diagram of an example system that can utilize service-related information to facilitate establishment of a data session(s) for a communication device in a communication network in accordance with another embodiment of the disclosed subject matter.

FIG. 2 depicts a block diagram of an example system 200 that can utilize service-related information to facilitate establishment of a data session(s) for a communication device (e.g., UE) in a communication network in accordance with another embodiment of the disclosed subject matter. The subject innovation can comprise a UE 202, base station 204, core network 206 (e.g., mobile core network), SGW 208, mobility gateways 210, 212 and 214 (e.g., PDN-GWs), policy component 216, standard policy component 218, session establishment components 220, 222 and 224, and service policy component 226, which each can include the same or similar functionality (or at least a portion thereof) as respectively named components, such as those more fully described herein, for example, with regard to system 100. In accordance with an embodiment, the SGW 208 can contain a service agent 228 that can be utilized to facilitate establishing data sessions associated with the UE 202 based at least in part on the service(s) or application(s) being initiated or used by the UE 202 (Note: FIG. 2 generically depicts services and applications as $SERVICE_1$ through $SERVICE_J$, with J being a positive integer), but is intended to cover services and/or applications). In an aspect, the service agent 228 can comprise the same or similar functionality as the UE service agent 128, as more fully described herein with regard to system 100.

In another aspect, when the UE 202 is turned on in the communication network or enters the communication network, the service agent 228 can initiate a download of a service policy table (or the default mobility gateway can otherwise provide (e.g., "push") the service policy table to the service agent 228) that can comprise service-related information that can facilitate identifying and/or selecting a mobility gateway (e.g., PDN-GW) to which the UE 202 is to be connected for a particular data session relating to a particular service or application. Each mobility gateway can be associated with a respective identifier (e.g., APN) that can be mapped to the particular service(s) or application(s) that such mobility gateway is able to facilitate or provide and the respective identifier, mapping, and service or application information for each mobility gateway can be stored in the service policy table associated with the service policy component 226 and provided to the service agent 228. The service policy table can be updated automatically (e.g., due to changes with respect to network resources) and/or periodically, as desired.

In still another aspect, when a data session is desired to be established with the UE 202 (e.g., UE-initiated, or initiated by another communication device to provide information to the UE 202), the service agent 228 can receive information that can indicate the service or application relating to the data session that is to be established (e.g., can receive such information from the UE 202). The service agent 228 can reference the desired service or application in the service policy table and determine the identifier associated with the mobility gateway (e.g., PDN-GW) which is desired in order to facilitate or provide the desired service or application to the UE 202. The service agent 228 can provide the identifier to the session establishment component (e.g., 220) of the default mobility gateway, which can use the identifier to select the desired dedicated mobility gateway associated with the identifier and set up a dedicated data connection (e.g., an additional data connection) with the desired dedicated mobility gateway to connect the UE 202 with the dedicated mobility gateway, in accordance with the predefined service criteria.

In an embodiment, as an alternative to, or in addition to, using the service policy table to facilitate establishing a data session for the UE 202, the session establishment component (e.g., 220) of a default mobility gateway can dynamically identify the service or application desired by the UE 202, based at least in part on information received by the session establishment component during initiation of the service or application, and can automatically or dynamically determine a desired mobility gateway with which to connect the UE 202 to establish the data session, based at least in part on the identified service or application and/or the predefined service criteria, in a similar manner to that as more fully described herein with regard to system 100, for example.

It is to be appreciated and understood that the subject innovation is depicted in FIG. 2 as having one UE 202; one base station 204; one core network 206; one SGW 208; three mobility gateways 210, 212, 214; one policy component 216; one standard policy component 218; three session establishment components 220, 222, and 224; one service policy component 226; one service agent 228; and three services available per mobility gateway (e.g., assigned to a mobility gateway); however, the subject innovation is not so limited, as there also can be more than one UE; more than one base station; more than one core network; more than one SGW; more than one policy component; less than or more than three gateways; more than one policy component; more than one standard policy component; less than or more than three session establishment components; more than one service policy component; more than one service agent; and/or less than or more than three services associated with each mobility gateway—as desired. It is to be further appreciated and understood that, while the policy component 216 is depicted as being in the core network 206, the subject innovation is not so limited, as, in accordance with various other embodiments, the policy component 216 can be a stand-alone unit, or can be part of another component in system 200, or portions (e.g., components) of the policy component 216 can be distributed as separate components throughout the system 200, as desired.

Figure 3:
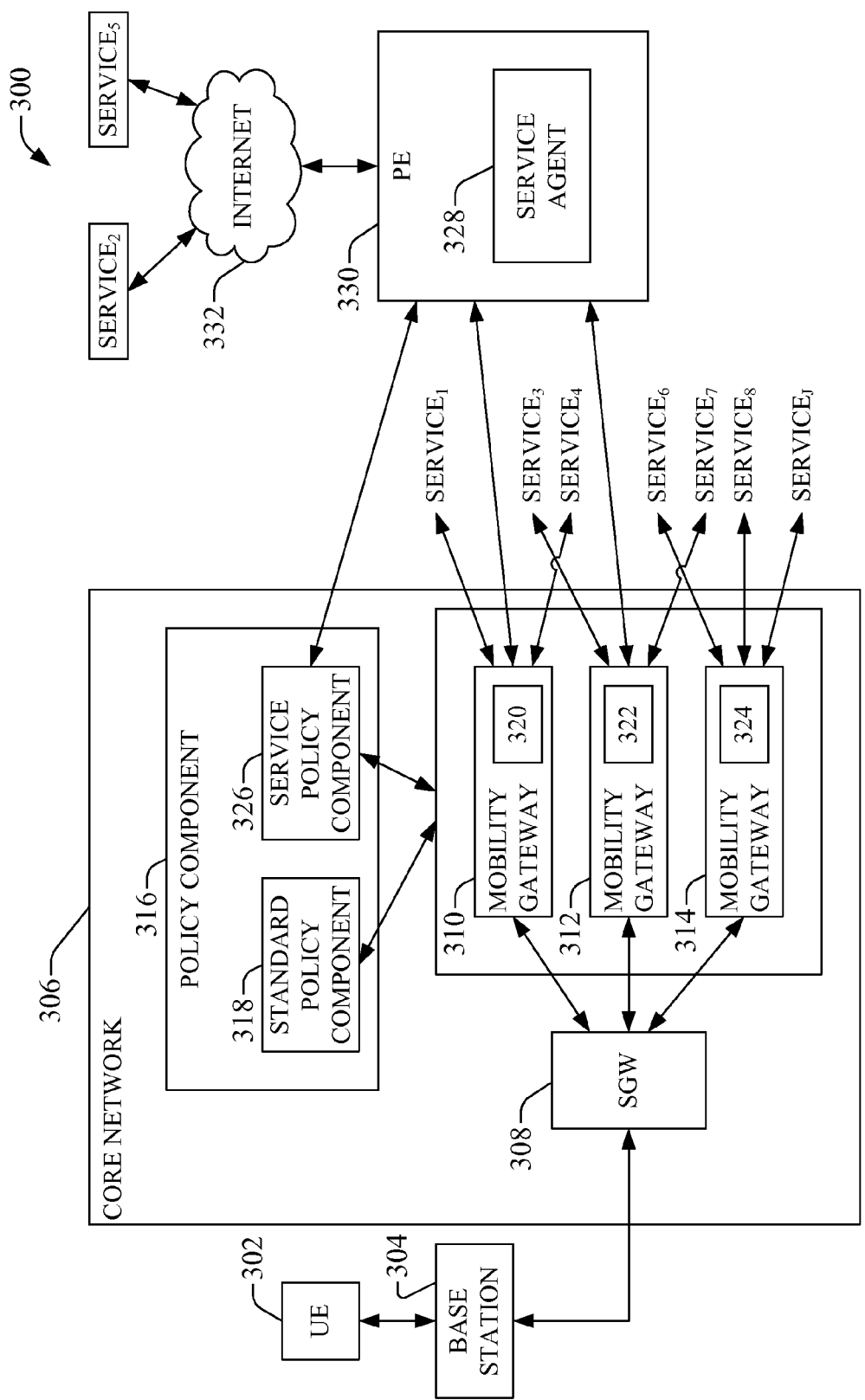
FIG. 3 illustrates a block diagram of an example system that can utilize service-related information to facilitate establishing a data session(s) for a communication device in a communication network in accordance with still another embodiment of the disclosed subject matter.

FIG. 3 depicts a block diagram of an example system 300 that can utilize service-related information to facilitate establishing a data session(s) for a communication device in a communication network in accordance with still another embodiment of the disclosed subject matter. The subject innovation can comprise a UE 302, base station 304, core network 306 (e.g., mobile core network), SGW 308, mobility gateways 310, 312 and 314 (e.g., PDN-GWs), policy component 316, standard policy component 318, session establishment components 320, 322 and 324, and service policy component 326, which each can include the same or similar functionality (or at least a portion thereof) as respectively named components, such as those more fully described herein, for example, with regard to system 100 and system 200.

In accordance with an embodiment, the system 300 can comprise a PE 330 (e.g., PE router or a session border controller (SBC)) that can facilitate providing services or application-related communications to the UE 302. In an aspect, the PE 330 can include a service agent 328 that can be utilized to facilitate establishing data sessions associated with the UE 302 based at least in part on the service(s) or application(s) being initiated or used by the UE 302 (Note: FIG. 3 generically depicts services and applications as $SERVICE_1$ through SERVICE$_J$, with J being a positive integer), but is intended to cover services and/or applications). In an aspect, the service agent 328 can comprise the same or similar functionality as the UE service agent 128 and the service agent 228, such as more fully described herein with regard to system 100 and system 200. In another aspect, the PE 330 can be associated with the Internet 332, where the Internet 332 can be associated with various services and/or applications, such as Service$_2$ and Service$_5$, and/or other communication devices (not shown) to facilitate providing the desired services and/or applications (e.g., Service$_2$ and/or Service$_5$) to the UE 302 and/or otherwise facilitate communication with the UE 302, as desired. As desired, the PE 330 can be associated with more or all of the services or applications (e.g., SERVICE$_1$ through SERVICE$_J$) than Service$_2$ and Service$_5$, and/or other services or applications can be respectively associated with one or more other PEs (which are not shown for reasons of brevity and clarity), where one or more of such other PEs can comprise a service agent, and such other PEs also can be associated with Service$_2$ and/or Service$_5$, as a particular service or application can be associated with a particular PE or more than one PE. Also, as desired, a desired portion of the services or applications (e.g., Service$_2$ and/or Service$_5$) can be associated with the Internet 332 (and a communication device(s), such as server(s), associated therewith) and/or another desired portion of the services or applications (e.g., Service$_1$, Service$_3$, . . . ) can be associated with a server(s) (e.g., application server(s), such as a multimedia server(s), messaging server(s), etc.) (not shown for reasons of brevity and clarity).

In another aspect, when the UE 302 is turned on in the communication network or enters the communication network, the service agent 328 can initiate a download of a service policy table (or the default mobility gateway associated with the UE 302 can otherwise provide (e.g., "push") the service policy table to the service agent 328), where the service policy table can comprise service-related information that can facilitate identifying and/or selecting a mobility gateway (e.g., PDN-GW) to which the UE 302 is to be connected for a particular data session relating to a particular service or application. Each mobility gateway can be associated with a respective identifier (e.g., APN) that can be mapped to the particular service(s) or application(s) that such mobility gateway is able to facilitate or provide and the respective identifier, mapping, and service or application information for each mobility gateway can be stored in the service policy table associated with the service policy component 326 and provided to the service agent 328. In an aspect, the service policy table can be updated automatically (e.g., due to changes with respect to network resources) and/or periodically, as desired.

In still another aspect, when a data session is desired to be established with the UE 302 (e.g., UE-initiated, or initiated by another communication device to provide information to the UE 302), the service agent 328 in the PE 330 can receive information that can indicate the service or application relating to the data session that is to be established (e.g., can receive such information from the UE 302 or the communication device desiring to communicate with the UE 302). The service agent 328 can reference the desired service or application in the service policy table and determine the identifier associated with the mobility gateway (e.g., PDN-GW) which is desired in order to facilitate or provide the desired service or application. The service agent 328 can provide the identifier to the session establishment component (e.g., 320) of the default mobility gateway (e.g., mobility gateway 310), which can use the identifier to select the desired dedicated mobility gateway (e.g., mobility gateway 312) associated with the identifier and set up a dedicated data connection (e.g., an additional data connection) with the desired dedicated mobility gateway to connect the UE 302 with the dedicated mobility gateway, in accordance with the predefined service criteria.

In an embodiment, as an alternative to, or in addition to, using the service policy table to facilitate establishing a data session for the UE 302, the session establishment component (e.g., 320) of a default mobility gateway (e.g., 310) can dynamically identify the service or application desired by the UE 302, based at least in part on information received by the session establishment component during initiation of the service or application, and can automatically or dynamically determine a desired mobility gateway (e.g., 312) with which to connect the UE 302 to establish the data session, based at least in part on the identified service or application and/or the predefined service criteria, in a similar manner to that as more fully described herein with regard to system 100 and system 200, for example.

It is to be appreciated and understood that the subject innovation is depicted in FIG. 3 as having one UE 302; one base station 304; one core network 306; one SGW 308; three mobility gateways 310, 312, 314; one policy component 316; one standard policy component 318; three session establishment components 320, 322, and 324; one service policy component 326; one service agent 328; one PE 330; and three services available per mobility gateway (e.g., assigned to a mobility gateway); however, the subject innovation is not so limited, as there also can be more than one UE; more than one base station; more than one core network; more than one SGW; more than one policy component; less than or more than three mobility gateways; more than one policy component; more than one standard policy component; less than or more than three session establishment components; more than one service policy component; more than one service agent; more than one PE; and/or less than or more than three services associated with each mobility gateway—as desired. It is to be further appreciated and understood that, while the policy component 316 is depicted as being in the core network 306, the subject innovation is not so limited, as, in accordance with various other embodiments, the policy component 316 can be a stand-alone unit, or can be part of another component in system 300, or portions (e.g., components) of the policy component 316 can be distributed as separate components throughout the system 300, as desired.

It is to be appreciated and understood that, as desired, one or more of systems 100, 200, or 300 (or desired portions thereof) can be combined or utilized in conjunction with each other. For example, one or more of the UE, SGW, or edge gateway (e.g., PE) can access and/or receive a service policy table (or desired portion thereof) and be employed to facilitate identifying and selecting a desired mobility gateway for a data session, based at least in part on the service or application associated with the data session being established, and/or can provide information that can facilitate identifying a service or application to be utilized by the UE for a data session. It is to be further appreciated and understood that, while the subject innovation has in many instances been described with respect to LTE technologies (e.g. LTE; LTE/Evolved Packet Core (LTE/EPC)), the subject innovation is not so limited, as, in accordance with various embodiments, the subject innovation can be employed with respect to other types of wireless technologies and wireless systems as well as wired technologies and wired systems, or a combination thereof.

Figure 4:
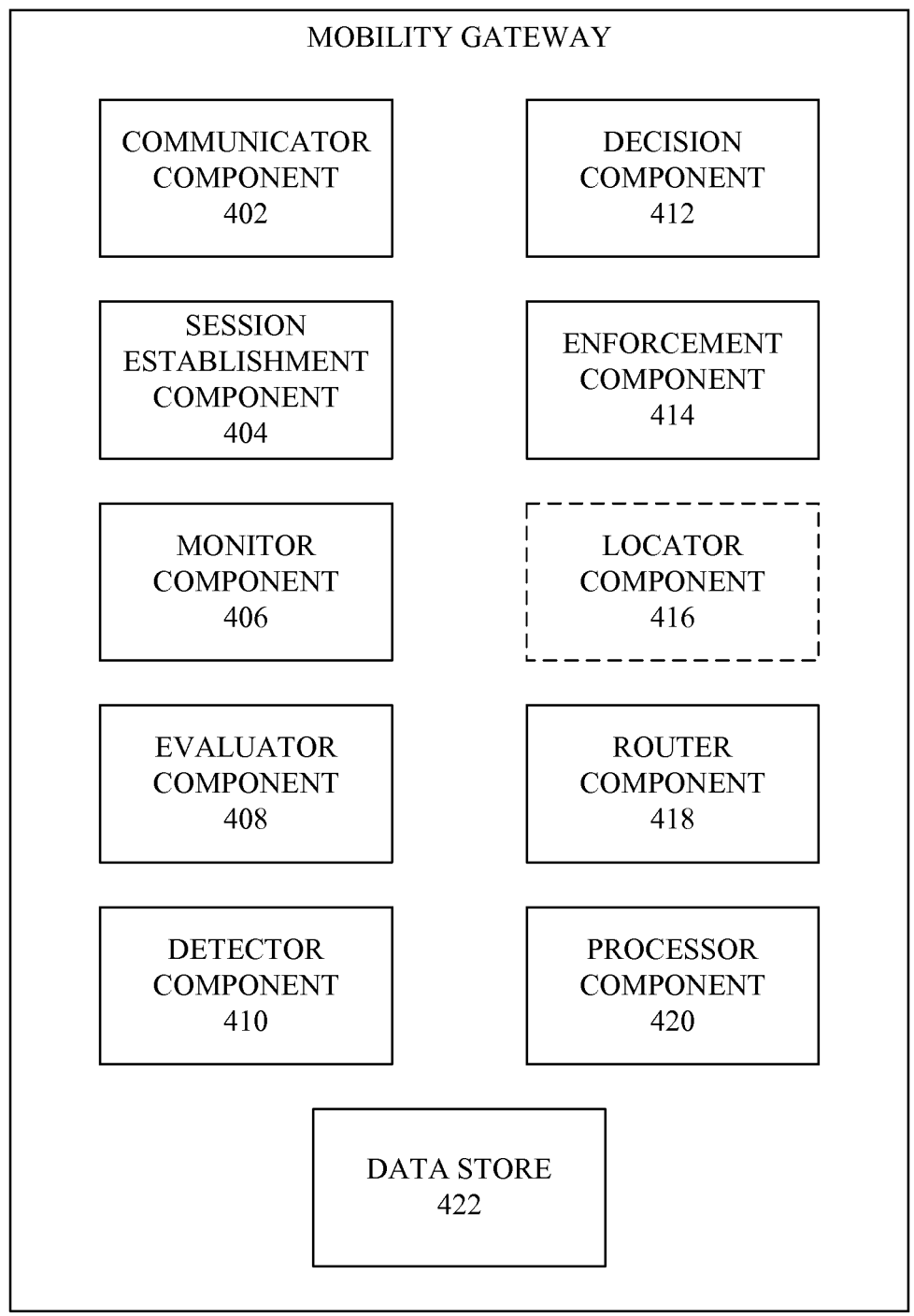
FIG. 4 depicts a block diagram of an example mobility gateway in accordance with an aspect of the disclosed subject matter.

FIG. 4 depicts a block diagram of an example mobility gateway 400 (e.g., PDN-GW) in accordance with an aspect of the disclosed subject matter. In an aspect, the mobility gateway 400 can be utilized to facilitate establishing data sessions respective associated with UEs in accordance with services or applications respectively used by the UEs in a communication network and the predefined service criteria. In an aspect, the mobility gateway 400 can include a communicator component 402 that can communicate (e.g., receive, transmit) information (e.g., information relating to establishing data sessions, routing of data traffic, etc.) to other desired components (e.g., UEs, SGW, PE, etc.) associated therewith.

In another aspect, the mobility gateway 400 also can include a session establishment component 404 that can facilitate establishing a data session for a UE, including establishing a dedicated data connection(s) between the UE and a desired mobility gateway(s) (e.g., PDN-GW(s)) based at least in part on the respective service(s) or application(s) to be utilized by the UE and the predefined service criteria (and corresponding service rules). In an aspect, the session establishment component 404 can access, retrieve, and/or update a service policy table, which can be utilized to facilitate identifying a desired mobility gateway (e.g., dedicated mobility gateway) to which to connect the UE for a particular data session. The service policy table can be such as more fully disclosed herein, for example, with regard to system 100.

In another aspect, when the mobility gateway 400 is the default mobility gateway and connected to the UE via a default data connection, the session establishment component 404 can receive an identifier relating to a desired mobility gateway (e.g., mobility gateway desired to be a dedicated mobility gateway for the UE for the data session) from the UE, where the UE can identify and select the identifier associated with the desired mobility gateway from the service policy table provided to the UE (e.g., via pushing the table to the UE, or the UE pulling the table from the core network) based at least in part on the service or application to be utilized by the UE. The session establishment component 404 can use the received identifier to identify and select the mobility gateway (e.g., PDN-GW) associated (e.g., linked) with such identifier and can facilitate establishing a connection between the UE and the desired mobility gateway.

In an alternate or additional embodiment, the session establishment component 404 can facilitate automatically or dynamically identifying and selecting a desired mobility gateway to which the UE can be connected for the data session based at least in part on the service or application to be used by the UE and the predefined service criteria. The session establishment component 404 can operate in conjunction with a monitor component 406, which can monitor and/or inspect (e.g., DPI) data traffic associated with the UE to facilitate identifying the service or application to be used by the UE, an evaluator component 408, which can analyze and/or evaluate information obtained as a result of the monitoring or inspection of the data traffic, and a detector component 410, which can detect or identify the service or application based at least in part on evaluation of the obtained information.

In still another aspect, the gateway 400 can comprise a decision component 412 (e.g., Policy Decision Function (PDF)) that can operate in conjunction with the session establishment component 404 to make or render decisions relating to establishment of data sessions associated with UEs (e.g., identification or selection of a mobility gateway to be connected to a UE for a data session relating to a particular service or application via dynamic gateway assignment or selection of a mobility gateway from a service policy table). The decision component 412 also can render or make other decisions relating to standard or conventional policies (e.g., other considerations regarding allocation of network resources, QoS, routing of data traffic, etc.) associated with the core network. In an aspect, the decision component 412 can operate in conjunction with an enforcement component 414 (e.g., Policy and Charging Enforcement Function (PCEF)) that can enforce or apply rules or decisions rendered by the decision component 412. For instance, the enforcement component 414 can operate in conjunction with the session establishment component 404 and decision component 412, with respect to establishment of data sessions associated with a UE based at least in part on service-related information, by enforcing or applying rules or decisions in accordance with the service or application being used by the UE and/or the predefined service criteria.

In accordance with an embodiment, the gateway 400 optionally can comprise a locator component 416 that can locate a UE when the UE is detected in the communication network and/or when a data session(s) is being established for the UE in the network. The locator component 416 can receive location information identifying the UE's location from the UE or another component, or can dynamically determine the location of the UE, to facilitate determining which mobility gateway(s) (e.g., PDN-GW(s)) the UE should be connected for the data session(s) in accordance with other service-related information and the predefined service criteria. In an aspect, the mobility gateway 400 can include a router component 418 that can facilitate routing data traffic in accordance with the rules and decisions of the decision component 412 and enforced by the enforcement component 414, in accordance with the specified policies (e.g., service-related policies, standard policies).

In yet another aspect, the mobility gateway 400 can comprise a processor component 420 that can work in conjunction with the other components (e.g., communicator component 402, session establishment component 404, monitor component 406, evaluator component 408, detector component 410, decision component 412, enforcement component 414, (optional) locator component 416, router component 418, etc.) to facilitate performing the various functions of the mobility gateway 400. The processor component 420 can employ one or more processors, microprocessors, or controllers that can process data, such as information relating to establishment of data sessions associated with UEs, identification or selection of mobility gateways with which to establish dedicated data connections for data sessions, respective locations of UEs, monitoring or inspection of data traffic associated with UEs, evaluation of information obtained in relation to monitoring or inspection of the data traffic, detection of a service or application to be utilized by a particular UE, etc., to facilitate establishing data sessions for UEs based at least in part on service-related information; and can control data flow between the mobility gateway 400 and other components (e.g., SGW, UEs, PEs, communication devices associated with the services or applications being used by the UEs, etc.) associated with the mobility gateway 400.

The mobility gateway 400 also can include a data store 422 that can store data structures (e.g., user data, metadata); code structure(s) (e.g., modules, objects, classes, procedures) or instructions; information relating to establishment of data sessions associated with UEs, identification or selection of a mobility gateway as a dedicated mobility gateway for a data session, inspection of data traffic, location information relating to a UE, etc.; routing information; the predefined service criteria and associated rules; network or device information like policies and specifications, paging protocols; code sequences for scrambling; cell IDs; and so on. In an aspect, the processor component 420 can be functionally coupled (e.g., through a memory bus) to the data store 422 in order to store and retrieve information desired to operate and/or confer functionality, at least in part, to the communicator component 402, session establishment component 404, monitor component 406, evaluator component 408, detector component 410, decision component 412, enforcement component 414, (optional) locator component 416, router component 418, and/or substantially any other operational aspects of the mobility gateway 400.

Figure 5:
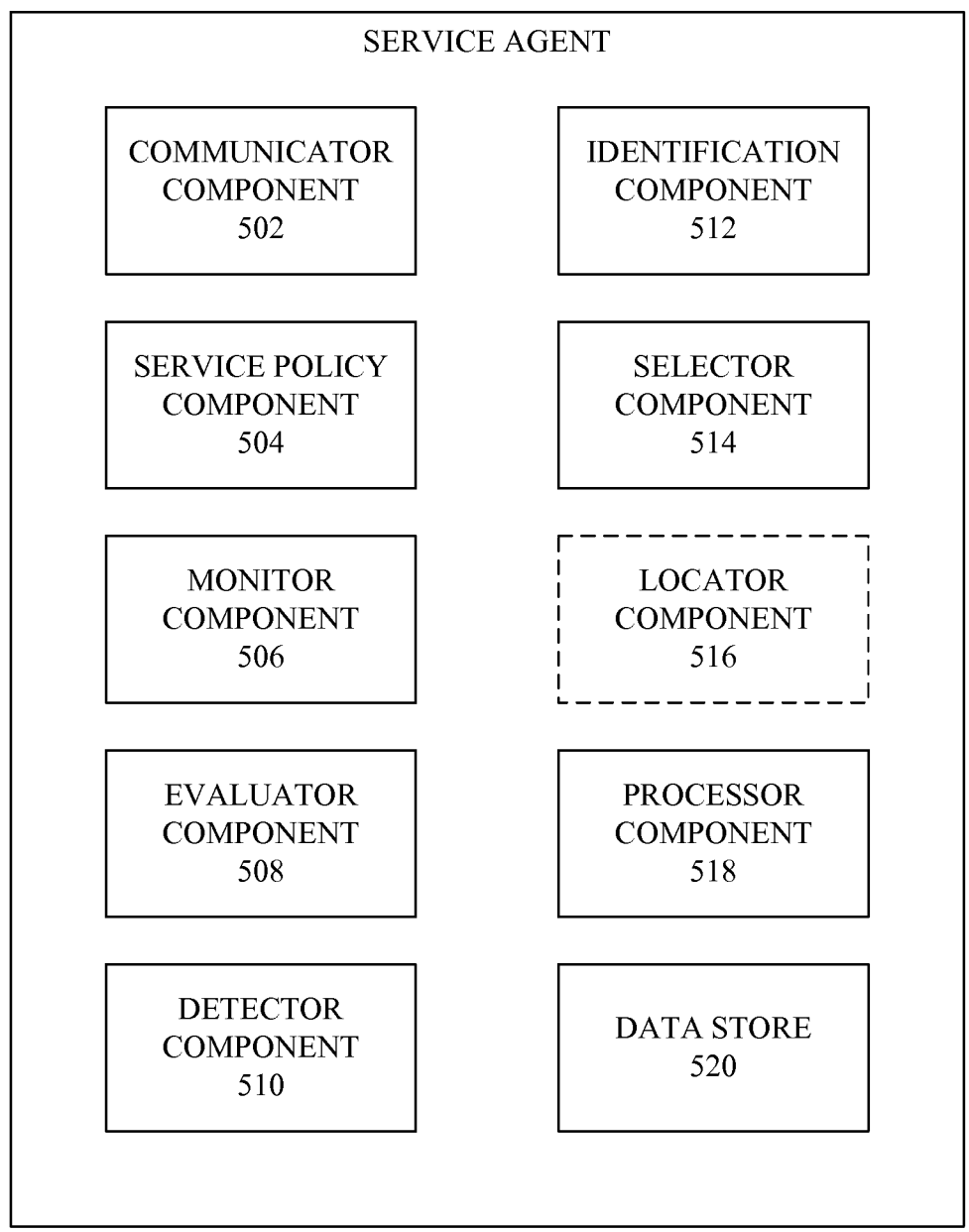
FIG. 5 illustrates a block diagram of an example service agent in accordance with various embodiments of the disclosed subject matter.

FIG. 5 illustrates a block diagram of an example service agent 500 in accordance with various embodiments of the disclosed subject matter. In an aspect, the service agent 500 can include a communicator component 502 that can communicate (e.g., receive, transmit) information, including information associated with a service policy table, information that can facilitate identifying a service or application to be used by a UE, location information associated with a UE, information identifying a desired mobility gateway (e.g., PDN-GW) for a data session (e.g., identifier associated with a desired mobility gateway), etc. In an aspect, the service agent 500 can comprise a service policy component 504 that can facilitate obtaining (e.g., via a request or "pull", or via a "push" from a mobility gateway, such as a default mobility gateway) a service policy table that can be utilized to facilitate identifying and selecting a desired mobility gateway to employ for a data session associated with a UE, where the service policy table can be the same or similar as that disclosed herein with regard to system 100, for example.

In another aspect, the service agent 500 can include a monitor component 506 that can monitor and/or inspect (e.g., via DPI) data traffic associated with a UE to facilitate identifying the service or application to be used by the UE. The service agent 500 also can contain an evaluator component 508 that can analyze and/or evaluate information obtained as a result of the monitoring or inspection of the data traffic associated with the UE. In another aspect, the service agent 500 can comprise a detector component 510 that can detect or identify the service or application to be used by the UE based at least in part on evaluation of the obtained information.

The service agent 500 also can include an identification component 512 that can identify an identifier associated with a desired mobility gateway (e.g., as contained in the service policy table) based at least in part on the service or application to be used by a UE for a data session. The service agent 500 can comprise a selector component 514 that can select the identifier associated with a desired mobility gateway in the service policy table. The communicator component 502 can transmit the selected identifier to the default mobility gateway associated with the UE.

In yet another aspect, optionally can include a locator component 516 that can locate a UE when the UE is detected in the communication network and/or when a data session(s) is being established for the UE in the network. The locator component 516 can receive location information identifying the UE's location from the UE or another component, or can dynamically determine the location of the UE, to facilitate determining which mobility gateway(s) (e.g., PDN-GW(s)) the UE should be connected for the data session(s) in accordance with other service-related information and the predefined service criteria.

In yet another aspect, the service agent 500 can comprise a processor component 518 that can work in conjunction with the other components (e.g., communicator component 502, service policy component 504, monitor component 506, evaluator component 508, detector component 510, identification component 512, selector component 514, (optional) locator component 516, etc.) to facilitate performing the various functions of the service agent 500. The processor component 518 can employ one or more processors, microprocessors, or controllers that can process data, such as information contained in the service policy table, information relating to identification of a service or application to be used by a UE for a data session, information relating to identification or selection of an identifier associated with a mobility gateway in relation to a service or application as provided in a service policy table, etc., to facilitate establishment of a data session for a UE, identification of an application or service to be used by a UE for a data session, identification or selection of a desired mobility gateway for a data session for a UE, or for other desired purposes; and can control data flow between the service agent 500 and other components (e.g., UE, mobility gateway, etc.) associated with the service agent 500.

The service agent 500 also can include a data store 520 that can store data structures (e.g., user data, metadata); code structure(s) (e.g., modules, objects, classes, procedures) or instructions; information contained in the service policy table, information relating to identification of a service or application to be used by a UE for a data session, information relating to identification or selection of an identifier associated with a mobility gateway in relation to a service or application as provided in a service policy table, etc., to facilitate establishment of a data session for a UE, identification of an application or service to be used by a UE for a data session, identification or selection of a desired mobility gateway for a data session for a UE, or for other desired purposes; routing information; network or device information like policies and specifications, paging protocols; code sequences for scrambling; and so on. In an aspect, the processor component 518 can be functionally coupled (e.g., through a memory bus) to the data store 520 in order to store and retrieve information desired to operate and/or confer functionality, at least in part, to the communicator component 502, service policy component 504, monitor component 506, evaluator component 508, detector component 510, identification component 512, selector component 514, (optional) locator component 516, and/or substantially any other operational aspects of the service agent 500.

Figure 6:
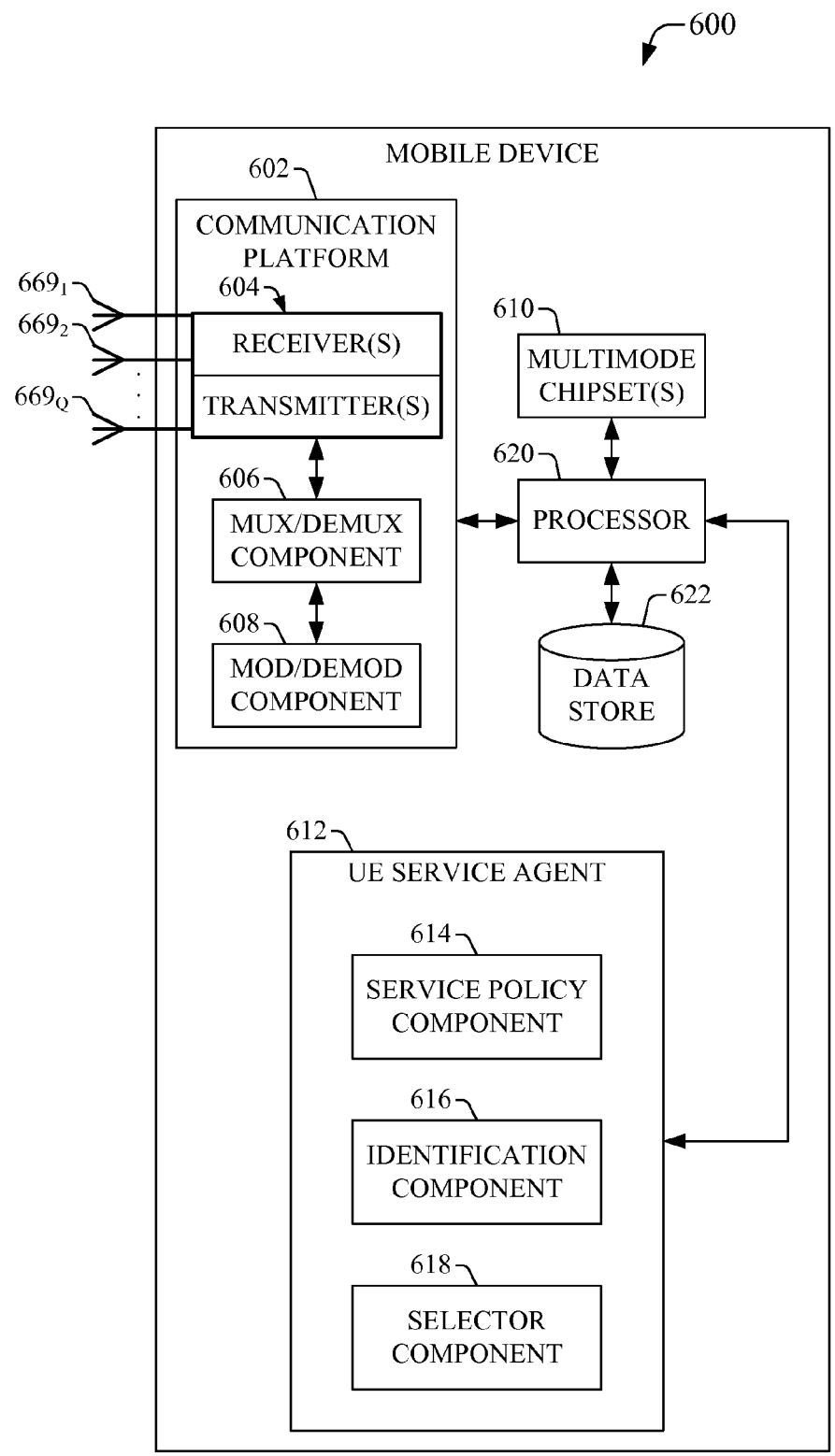
FIG. 6 depicts a block diagram of an example mobile device in accordance with an aspect of the disclosed subject matter.

FIG. 6 depicts a block diagram of an example mobile device 600 (e.g., UE) in accordance with an aspect of the disclosed subject matter. In an aspect, the mobile device 600 can be a multimode access terminal, wherein a set of antennas $669_1$-$669_Q$ (Q is a positive integer) can receive and transmit signal(s) from and to wireless devices like access points, access terminals, wireless ports and routers, and so forth, that operate in a radio access network. It should be appreciated that antennas $669_1$-$669_Q$ are a part of communication platform 602, which comprises electronic components and associated circuitry that provide for processing and manipulation of received signal(s) and signal(s) to be transmitted; e.g., receivers and transmitters 604, multiplexer/demultiplexer (mux/demux) component 606, and modulation/demodulation (mod/demod) component 608.

In another aspect, multimode operation chipset(s) 610 can allow the mobile device 600 to operate in multiple communication modes in accordance with disparate technical specification for wireless technologies. In an aspect, multimode operation chipset(s) 610 can utilize communication platform 602 in accordance with a specific mode of operation (e.g., voice, GPS). In another aspect, multimode operation chipset(s) 610 can be scheduled to operate concurrently (e.g., when Q>1) in various modes or within a multitask paradigm.

In still another aspect, the mobile device 600 can comprise a UE service agent 612 that can be employed to facilitate establishing a data session for the mobile device 600, for example, by identifying and selecting an identifier associated with a mobility gateway (e.g., PDN-GW) in a service policy table based at least in part on the service or application to be used for the data session. In an aspect, the UE service agent 612 can include a service policy component 614 that can facilitate obtaining (e.g., via a request or "pull", or via a "push" from a mobility gateway, such as a default mobility gateway) a service policy table that can be utilized to facilitate identifying and selecting a desired mobility gateway to employ for a data session associated with the mobile device 600, where the service policy table can be the same or similar as that disclosed herein with regard to system 100, for example.

In an aspect, the UE service agent 612 can include an identification component 616 that can identify an identifier associated with a desired mobility gateway (e.g., as contained in the service policy table) based at least in part on the service or application to be used by the mobile device 600 for a data session. The UE service agent 612 also can contain a selector component 618 that can select the identifier associated with a desired mobility gateway in the service policy table. The communication platform 602 can transmit the selected identifier to the default mobility gateway associated with the mobile device 600 to facilitate establishing the data session relating to the service or application.

In still another aspect, the mobile device 600 also can include a processor(s) 620 that can be configured to confer functionality, at least in part, to substantially any electronic component within the mobile device 600, in accordance with aspects of the subject innovation. For example, the processor (s) 620 can facilitate enabling the mobile device 600 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 620 can facilitate enabling the mobile device 600 to process data relating to the UE service agent 612 (e.g., obtaining the service policy table; identifying a gateway identifier associated with a service or application in the service policy table; selecting the desired gateway identifier in the service policy table; etc.).

The mobile device 600 also can contain a data store 622 that can store data structures (e.g., user data, metadata); code structure(s) (e.g., modules, objects, classes, procedures) or instructions; the service policy table (or a desired portion thereof); information relating to obtaining the service policy table; information relating to identifying a gateway identifier associated with a service or application in the service policy table, where the gateway identifier can correspond to a mobility gateway that can facilitate providing the desired service or application; information relating to selecting the desired gateway identifier in the service policy table; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 620 can be functionally coupled (e.g., through a memory bus) to the data store 622 in order to store and retrieve information (e.g., frequency offsets, desired algorithms, etc.) desired to operate and/or confer functionality, at least in part, to communication platform 602, multimode operation chipset(s) 610, UE service agent 612, and/or substantially any other operational aspects of the mobile device 600.

Figure 7:
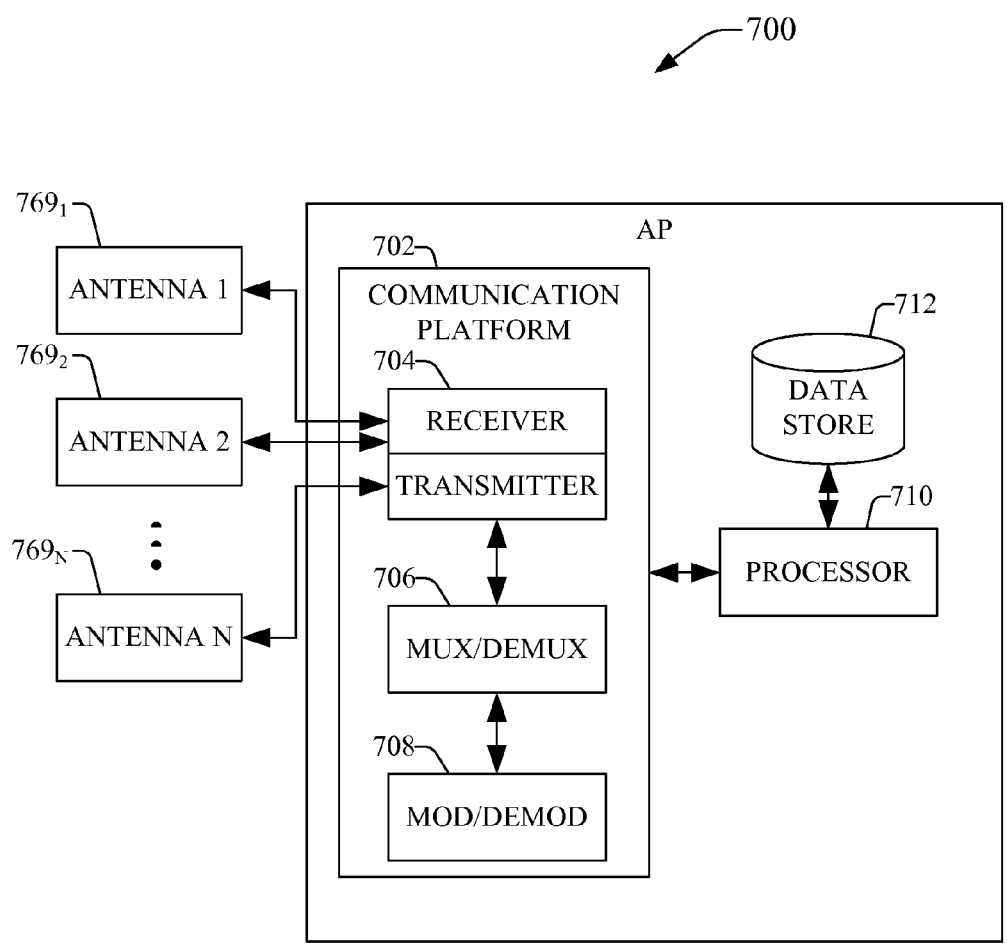
FIG. 7 illustrates a block diagram of an example access point (AP) in accordance with an aspect of the disclosed subject matter.

FIG. 7 illustrates a block diagram of an example AP 700 (e.g., base station) in accordance with an aspect of the disclosed subject matter. The AP 700 can receive and transmit signal(s) from and to wireless devices like access points (e.g., base stations, femto APs, pico APs), access terminals (e.g., UEs), wireless ports and routers, and the like, through a set of antennas $769_1$-$769_N$. In an aspect, the antennas $769_1$-$769_N$ are a part of a communication platform 702, which comprises electronic components and associated circuitry that can provide for processing and manipulation of received signal(s) and signal(s) to be transmitted. In an aspect, the communication platform 702 can include a receiver/transmitter 704 that can convert signal from analog to digital upon reception, and from digital to analog upon transmission. In addition, receiver/transmitter 704 can divide a single data stream into multiple, parallel data streams, or perform the reciprocal operation.

In an aspect, coupled to receiver/transmitter 704 can be a multiplexer/demultiplexer (mux/demux) 706 that can facilitate manipulation of signal in time and frequency space. The mux/demux 706 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 706 can scramble and spread information (e.g., codes) according to substantially any code known in the art, e.g., Hadamard-Walsh codes, Baker codes, Kasami codes, polyphase codes, and so on. A modulator/demodulator (mod/demod) 708 also can be part of the communication platform 702, and can modulate information according to multiple modulation techniques, such as frequency modulation, amplitude modulation (e.g., M-ary quadrature amplitude modulation (QAM), with M a positive integer), phase-shift keying (PSK), and the like.

The AP 700 also can comprise a processor(s) 710 that can be configured to confer and/or facilitate providing functionality, at least partially, to substantially any electronic component in or associated with the AP 700. For instance, the processor(s) 710 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc.

In another aspect, the AP 700 can include a data store 712 that can store data structures; code instructions; rate coding information associated with a served access terminal; system or device information like policies and specifications; code sequences for scrambling; spreading and pilot transmission; floor plan configuration; access point deployment and frequency plans; scheduling policies; and so on. The processor (s) 710 can be coupled to the data store 712 in order to store and retrieve information (e.g., information, such as algorithms, relating to multiplexing/demultiplexing or modulation/demodulation, etc.) desired to operate and/or confer functionality to the communication platform 702, and/or other operational components of AP 700.

In view of the example systems described herein, example methodologies that can be implemented in accordance with the disclosed subject matter can be better appreciated with reference to flowcharts in FIGS. 8-11. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 8:
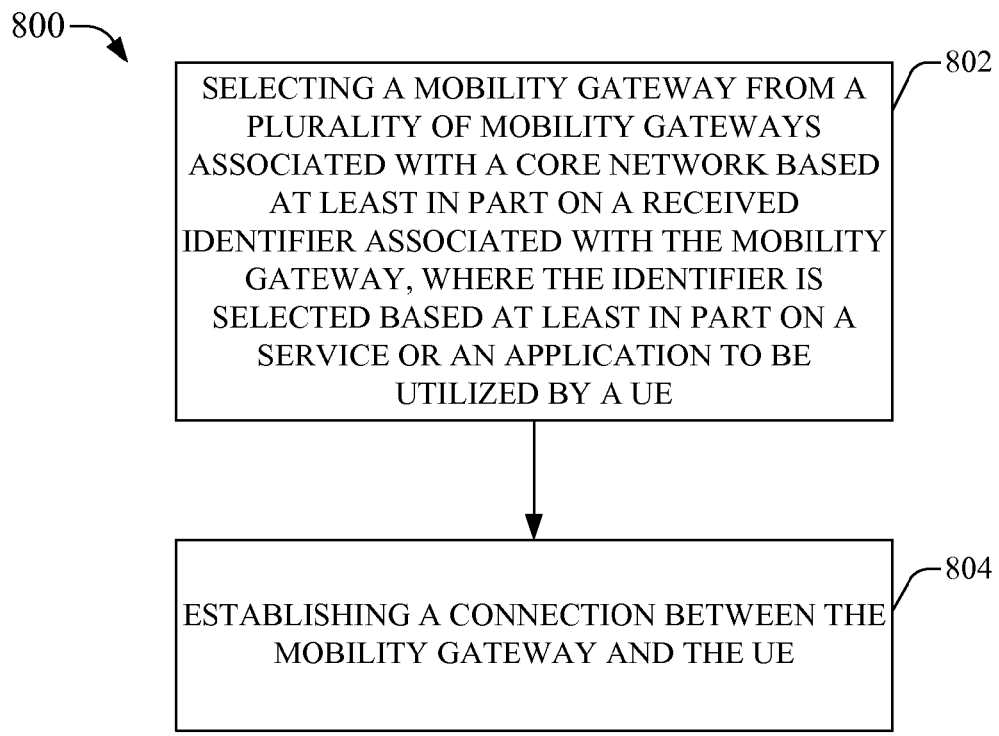
FIG. 8 illustrates a flowchart of an example methodology for utilizing service-related information to facilitate establishing a data session associated with a communication device in a communication network in accordance with various aspects of the disclosed subject matter.

FIG. 8 presents a flowchart of an example methodology 800 for utilizing service-related information to facilitate establishing a data session associated with a communication device (e.g., UE) in a communication network in accordance with various aspects of the disclosed subject matter. At 802, a mobility gateway can be selected from a plurality of mobility gateways associated with a core network based at least in part on a received identifier associated with the mobility gateway, where the identifier is selected based at least in part on a service or an application to be utilized by the UE. In an aspect, the UE can obtain a service policy table (e.g., by requesting or "pulling" the service policy table or by the default gateway "pushing" the service policy table to the UE in accordance with a specified service rule when the default data connection is established between the UE and default mobility gateway), which can contain identifiers (e.g., APNs) respectively associated with mobility gateways (e.g., PDN-GWs) in the core network, where each identifier can be mapped to the service(s) or application(s) that the mobility gateway associated with the identifier is available to facilitate providing (e.g., mobility gateway can connect (directly or indirectly) with the desired service or application to facilitate communication of data between the UE and the service or application). In accordance with various embodiments, an identifier associated with the service or application to be utilized by the UE, and corresponding to the desired mobility gateway that can facilitate providing the service or application, can be identified in the service policy table by the UE (or an edge gateway, such as a PE; or an SGW)), based at least in part on a mapping of the identifier with the service or application, or can be dynamically determined based at least in part on the predefined service criteria.

At 804, a connection (e.g., dedicated data connection) can be established between the mobility gateway, which is associated with the identifier, and the UE. In an aspect, a session establishment component of the default mobility gateway can facilitate connecting the desired mobility gateway(s) (e.g., dedicated mobility gateway(s)) and the UE to facilitate establishing the data session(s) for the UE via the desired mobility gateway(s).

Figure 9:
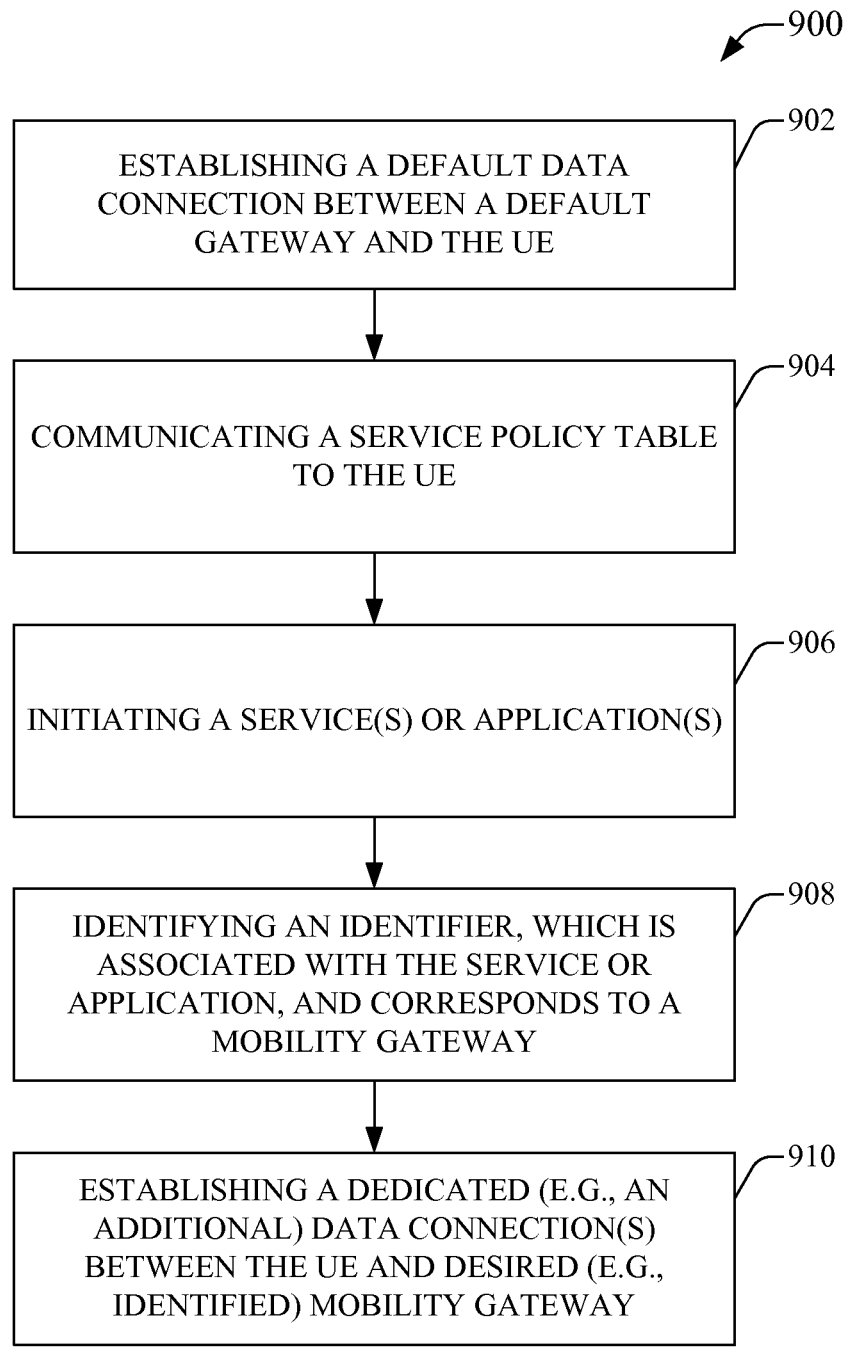
FIG. 9 depicts a flowchart of an example methodology that can employ service-related information to facilitate establishing a data session associated with a communication device in a communication network in accordance with an aspect of the disclosed subject matter.

FIG. 9 depicts a flowchart of an example methodology 900 that can employ service-related information to facilitate establishing a data session associated with a communication device (e.g., UE) in a communication network in accordance with an aspect of the disclosed subject matter. At 902, a default data connection can be established between a default mobility gateway and the UE. For instance, when the UE is detected by the core network (e.g., when it is turned on in or enters an area covered by the core network), a mobility gateway can be selected as a default mobility gateway and a default or initial data connection (e.g., default bearer) can be established between the UE and default mobility gateway to facilitate communication between the UE and core network.

At 904, a service policy table can be communicated to the UE. In an aspect, the service policy table can be obtained by the UE in response to a request to download sent from the UE to the default mobility gateway (e.g., "pull") or in response to a network-initiated transmission (e.g., default mobility gateway-initiated transmission) (e.g., "push") in accordance with a specified service rule. The service policy table can be stored in a data store in the UE.

At 906, a service(s) or application(s) can be initiated. In an aspect, a service(s) or application(s) can be initiated, for example, by the UE or another communication device that desires to communicate with the UE. At 908, an identifier (e.g., APN) associated with the service or application can be identified, where the identifier can correspond with a mobility gateway. In accordance with various embodiments, the UE or an edge gateway can reference the initiated service or application in the service policy table and can identify the identifier mapped to the service or application, where the identifier can be associated with a specified mobility gateway in the core network. In accordance with another embodiment, the default mobility gateway can automatically or dynamically identify the application or service being initiated and can automatically or dynamically identify, select, and/or assign a desired identifier or associated (e.g., corresponding) desired mobility gateway that can be utilized to facilitate providing the desired service or application.

At 910, a dedicated data connection (e.g., additional data connection to the UE) can be established between the UE and desired mobility gateway. In an aspect, the desired mobility gateway (e.g., dedicated mobility gateway) can facilitate establishing a dedicated data connection (e.g., dedicated bearer) between the UE and the desired mobility gateway to facilitate establishing a data session between the UE and the service or application provider. It is to be appreciated that, as desired, more than one dedicated data connection can be established between the UE and respective dedicated mobility gateways when there is more than one service or application being utilized by the UE in accordance with the respective services or applications being used. The data session(s) between the UE and the service(s) or application(s) can be processed via the dedicated mobility gateway(s).

Figure 10:
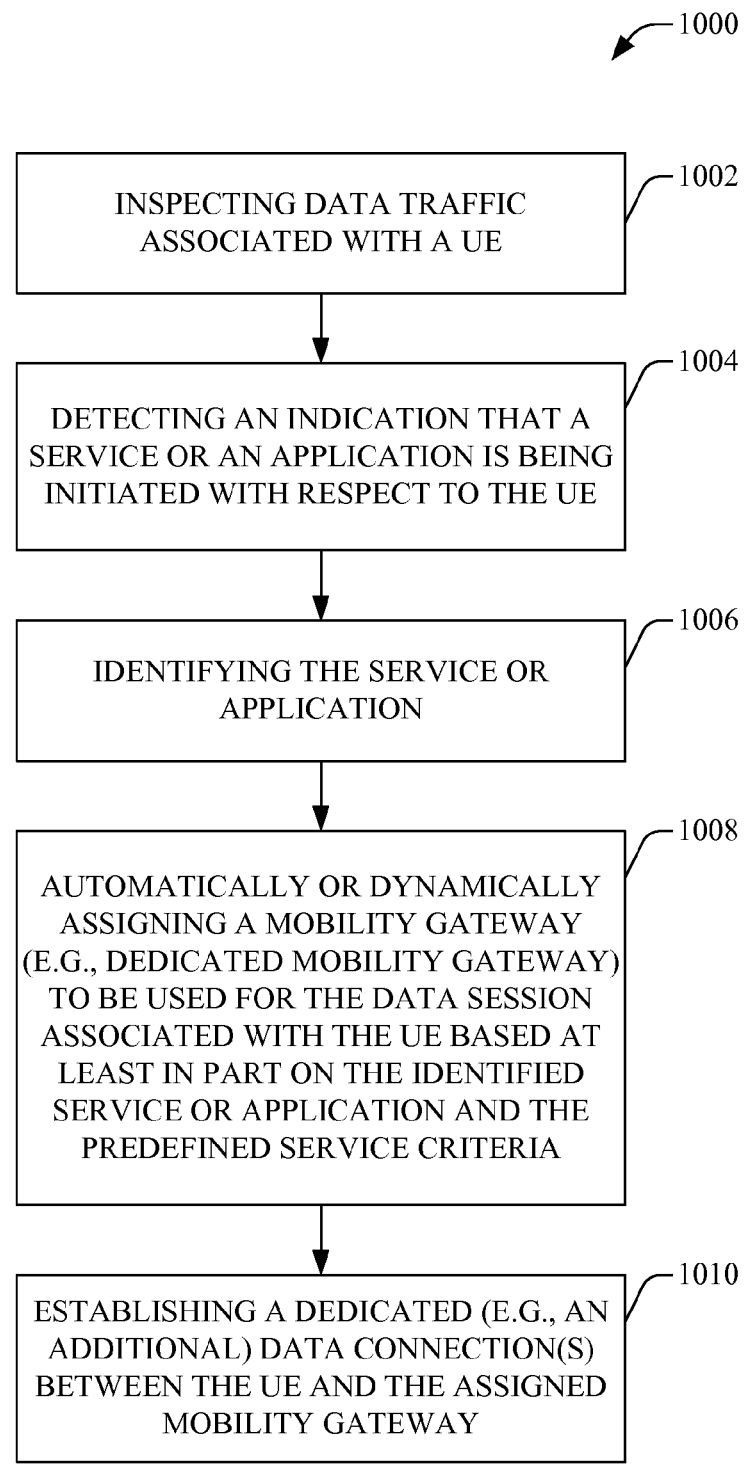
FIG. 10 illustrates a flowchart of an example methodology that can automatically or dynamically assign a mobility gateway for a data session associated with a communication device in a communication network in accordance with an embodiment of the disclosed subject matter.

FIG. 10 illustrates a flowchart of an example methodology 1000 that can automatically or dynamically assign a mobility gateway (e.g., PDN-GW) for a data session associated with a communication device (e.g., UE) in a communication network in accordance with an embodiment of the disclosed subject matter. At 1002, data traffic associated with a UE can be inspected. In an aspect, a default data connection can be established between the UE and a default mobility gateway (e.g., PDN-GW selected to establish an initial connection with the UE), for example, when the UE is detected by the core network (e.g., the UE is turned on while in the core network, the UE enters an area covered by the core network). The default mobility gateway can monitor or inspect data traffic associated with the UE and can detect when the UE has initiated the service or application. At 1004, an indication that a service or an application is being initiated with respect to the UE can be detected. In an aspect, the default mobility gateway can inspect the data traffic associated with the UE and can detect when the service or application is initiated by the UE or another communication device desiring to communicate with the UE.

At 1006, the service or application can be identified. In an aspect, the default mobility gateway can inspect the data traffic (e.g., perform DPI) and can automatically or dynamically identify or determine the initiated service or application associated with the UE.

At 1008, a mobility gateway (e.g., dedicated mobility gateway) can be automatically or dynamically assigned to be used for the data session associated with the UE based at least in part on the identified service or application and the predefined service criteria (and associated service rules). In an aspect, the default mobility gateway can apply one or more predefined service rules to facilitate determining which mobility gateway to employ for the data session and can automatically or dynamically assign a mobility gateway that satisfies the predefined service rules for the data session associated with the UE.

At 1010, a dedicated data connection (e.g., additional data connection to the UE) can be established between the UE and the assigned mobility gateway (e.g., dedicated mobility gateway). In an aspect, the assigned mobility gateway can facilitate establishing a dedicated data connection between the assigned mobility gateway and the UE to facilitate establishing a data session with regard to the service or application. It is to be appreciated and understood that, as desired, more than one dedicated data connection can be established between the UE and respective assigned mobility gateways (or more than one dedicated data connection between the UE and the assigned mobility gateway) when there is more than one service or application being utilized by the UE, in accordance with the respective services or applications being used and the predefined service criteria. The data session(s) between the UE and the service(s) or application(s) can be processed via the assigned mobility gateway(s).

Figure 11:
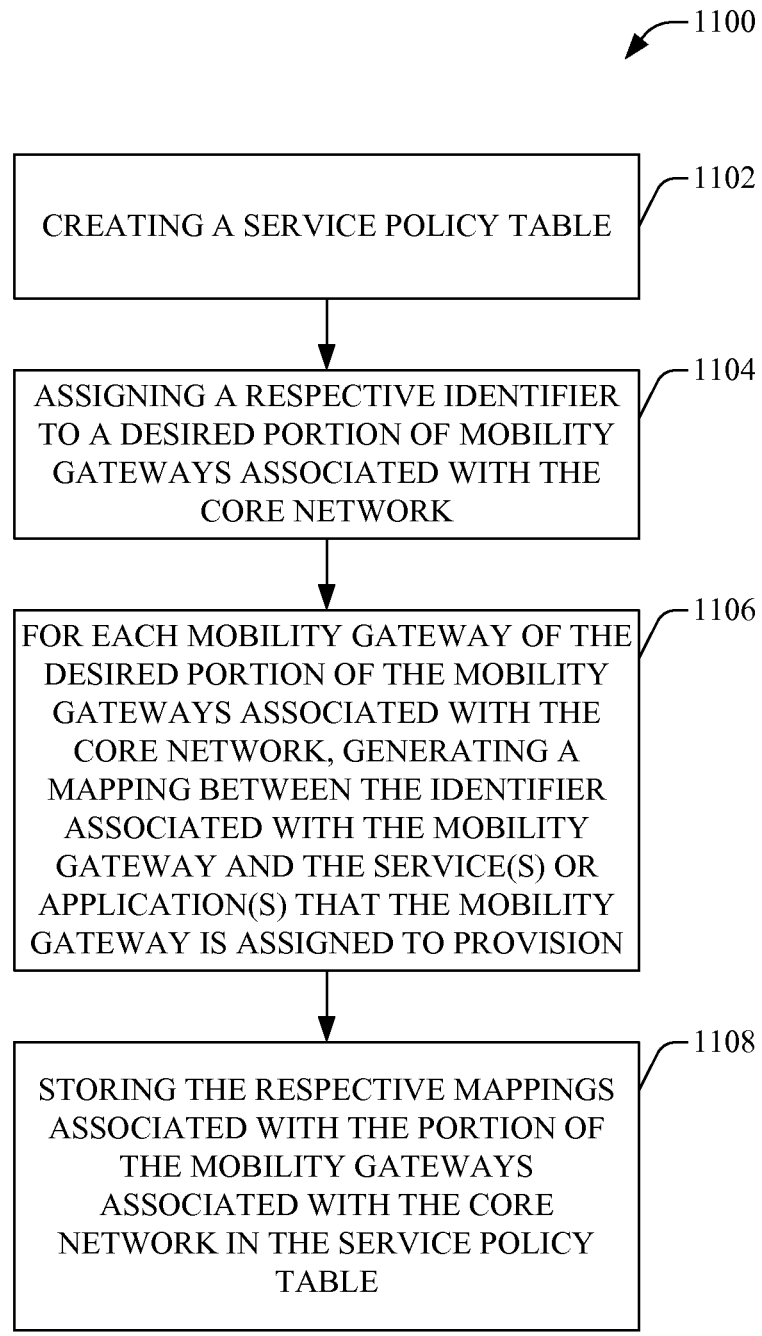
FIG. 11 illustrates a flowchart of an example methodology that can generate a service policy table that can be employed to facilitate enabling service-related information to be utilized in order to facilitate establishing data sessions in a communication network in accordance with another aspect of the disclosed subject matter.

FIG. 11 illustrates a flowchart of an example methodology 1100 that can generate a service policy table that can be employed to facilitate enabling service-related information to be utilized in order to facilitate establishing data sessions in a communication network in accordance with another aspect of the disclosed subject matter. At 1102, a service policy table can be created. In an aspect, the service policy component can facilitate creating the service policy table. At 1104, a respective identifier can be assigned to one or more of the mobility gateways associated with the core network.

At 1106, for all or a desired portion of the mobility gateways associated with the core network, a mapping can be generated between the identifier associated with the mobility gateway and the service(s) or application(s) that the mobility gateway is assigned to provision. In an aspect, a mobility gateway can be employed to facilitate processing data sessions associated with one or more services and/or one or more applications, in accordance with the predefined service criteria (and associated service rules). The identifier associated with that mobility gateway can be mapped with, linked to, or otherwise associated with, each of the respective service(s) or application(s) for which use of the mobility gateway is desired during a particular data session relating to the respective service(s) or application(s).

At 1108, the respective mappings respectively associated with mobility gateways associated with the core network can be stored in the service policy table. In accordance with an aspect, the service policy component (e.g., 126, 226, 326) can facilitate updating the service policy table with new information (e.g., change in availability of a mobility gateway for use with a specified service or application, modification of a mapping associated with a mobility gateway, etc.), as desired (e.g., automatically or periodically), to reflect any changes associated with the mobility gateways or the UE, for example.

In one aspect, a UE, an edge gateway (e.g., PE), and/or an SGW can utilize the service policy table to facilitate identifying and/or selecting a desired mobility gateway that can be used for a data session relating to a particular service or application. For example, when a service or application is initiated with respect to the UE, the UE, edge gateway, and/or SGW can reference (e.g., look up) the initiated service or application in the service policy table and can locate and identify an identifier, which is associated with a respective mobility gateway, and which is mapped to the initiated service or application. The identifier can be provided to the default mobility gateway, where the default mobility gateway can use the identifier to identify or determine which mobility gateway is to be assigned for the data session. The desired mobility gateway associated with the identifier can be assigned for the data session, and the desired mobility gateway can facilitate establishing a dedicated data connection (e.g., an additional data connection) between the UE and the desired mobility gateway to facilitate establishing the data session relating to the service or application.

It also is to be appreciated and understood that components (e.g., UE, base station, core network, SGW, mobility gateway, policy component, standard policy component, service policy component, UE service agent, service agent, session establishment component, etc.), as described with regard to a particular system or methodology, can include the same or similar functionality as respective components (e.g., respectively named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory storing computer-executable instructions; and
a processor, communicatively coupled to the memory, that facilitates execution of the computer-executable instructions to at least:
   select a mobility gateway device of a plurality of mobility gateway devices based on a mobility gateway identifier received from a communication device via a default communication connection to facilitate establishment of a dedicated communication connection between the communication device and the mobility gateway device to facilitate communication of traffic between the communication device and a service employed during a communication session, wherein the mobility gateway identifier is associated with the mobility gateway device and is mapped to the service; and
   in response to the mobility gateway device being selected, establish the dedicated communication connection between the communication device and the mobility gateway device.

2. The system of claim 1, wherein the mobility gateway device is selected based on a service rule in accordance with a defined service criterion.

3. The system of claim 2, wherein the defined service criterion relates to respective amounts of latency determined to be expected to be incurred in relation to respective mobility gateway devices of the plurality of mobility gateway devices.

4. The system of claim 1, wherein the processor further facilitates the execution of the computer-executable instructions to:
   inspect traffic associated with the communication device; and
   identify the service based on the inspected traffic to facilitate the selection of the mobility gateway device.

5. The system of claim 1, wherein the processor further facilitates the execution of the computer-executable instructions to transmit at least a portion of service policy data to the communication device in response to reception of an indication that the service has been initiated with respect to the communication device.

6. The system of claim 5, wherein the processor further facilitates the execution of the computer-executable instructions to
   receive the mobility gate identifier from the communication device, wherein the communication device identifies the service in at least the portion of the service policy data to facilitate identification of the mobility gateway identifier associated with the mobility gateway device in at least the portion of the service policy data.

7. The system of claim 6, wherein the service policy data comprises a mapping of service identifiers to mobility gateway identifiers including the mobility gateway identifier, the service identifiers are respectively associated with services of a plurality of services including the service, and the mobility gateway identifiers are respectively associated with mobility gateway devices of the plurality of mobility gateway devices.

8. The system of claim 6, wherein the processor further facilitates the execution of the computer-executable instructions to:
   inspect traffic associated with the communication device;
   identify the service based on the inspected traffic;
   reference the service in the service policy data; and
   identify the mobility gateway identifier associated with the mobility gateway device, wherein the mobility gateway identifier is mapped to the service in the service policy data.

9. The system of claim 1, wherein the processor further facilitates the execution of the computer-executable instructions to
   facilitate creation of service policy data that includes a plurality of mobility gateway identifiers respectively associated with mobility gateway devices of the plurality of mobility gateway devices, wherein the plurality of mobility gateway identifiers are respectively mapped to respective services, including the service, in accordance with a defined service criterion.

10. The system of claim 1, wherein the mobility gateway device is selected based on the service and the processor further facilitates the execution of the computer-executable instructions to:
   select a second mobility gateway device of the plurality of mobility gateway devices based on a second service, wherein the second mobility gateway device is selected to facilitate communication of second traffic between the communication device and the second service employed during a second communication session that occurs concurrently with the communication session.

11. The system of claim 1, the communication device is a computing device comprising voice and data communication functionality.

12. A method, comprising:
selecting, by a system including a processor, a mobility gateway device from a plurality of mobility gateway devices associated with a network device based on a received identifier that corresponds with the mobility gateway device to facilitate establishing a dedicated communication connection between a mobile communication device and the mobility gateway device, wherein the received identifier is mapped to a service to be utilized by the mobile communication device during a communication session; and
in response to the selecting of the mobility gateway device, establishing, by the system, the dedicated communication connection between the mobility gateway device and the mobile communication device to facilitate communicating traffic associated with the mobile communication device during the communication session.

13. The method of claim 12, further comprising:
inspecting, by the system, the traffic associated with the mobile communication device;
identifying, by the system, the service based on the inspecting of the traffic;
selecting, by the system, the mobility gateway device based on a defined service criterion and the service; and
assigning, by the system, the mobility gateway device to the communication session.

14. The method of claim 12, further comprising:
detecting, by the system, the mobile communication device;
establishing, by the system, an initial communication connection between the mobile communication device and a default mobility gateway device; and
transmitting, by the system, a service policy table comprising at least a mapping of the received identifier to the service in response to the initial communication connection being established between the mobile communication device and the default mobility gateway device.

15. The method of claim 14, further comprising:
referencing, by the system, the service policy table to locate the service in the service policy table;
identifying, by the system, the received identifier associated with the service based on a mapping of the received identifier to the service contained in the service policy table; and
transmitting, by the system, the received identifier to the default mobility gateway device.

16. The method of claim 14, further comprising:
transmitting, by the system, the service policy table; and
receiving, by the system, the received identifier to facilitate the selecting of the mobility gateway device for the communication session.

17. The method of claim 14, further comprising:
receiving, by the system, a request to download the service policy table;
transmitting, by the system, at least a portion of the service policy table in response to the received request; and
receiving, by the system, the received identifier to facilitate the selecting of the mobility gateway device for the communication session.

18. The method of claim 12, further comprising:
creating, by the system, service policy data comprising identifiers respectively associated with mobility gateway devices of the plurality of mobility gateway devices;
generating, by the system, a mapping of an identifier of the plurality of identifiers to the service, wherein the identifier is the received identifier; and
storing, by the system, the mapping in the service policy data.

19. The method of claim 18, further comprising:
updating, by the system, at least a portion of the service policy data with new information in response to detecting a change associated with the mobile communication device.

20. A non-transitory computer-readable storage medium storing computer-executable instructions that, in response to execution, cause a system including a processor to perform operations, comprising:
selecting a mobility gateway device from a plurality of mobility gateway devices associated with a core network device based on a identifier received by the system and associated with the mobility gateway device to facilitate establishing a dedicated communication connection between a communication device and the mobility gateway device, wherein the identifier is mapped to a service to be utilized by the communication device during a communication session; and
in response to the selecting of the mobility gateway device, establishing the dedicated communication connection between the mobility gateway device and the communication device to facilitate communicating traffic associated with the communication device during the communication session.

* * * * *